US008692164B2

(12) United States Patent
Krishnan

(10) Patent No.: US 8,692,164 B2
(45) Date of Patent: Apr. 8, 2014

(54) COOKING APPLIANCE

(75) Inventor: Arvind G. Krishnan, Venetia, PA (US)

(73) Assignee: Soul of India, LLC, Venetia, PA (US)

( * ) Notice: Subject to any disclaimer, the term of this patent is extended or adjusted under 35 U.S.C. 154(b) by 1034 days.

(21) Appl. No.: 11/560,218

(22) Filed: Nov. 15, 2006

(65) Prior Publication Data
US 2007/0221653 A1 Sep. 27, 2007

Related U.S. Application Data

(60) Provisional application No. 60/781,837, filed on Mar. 13, 2006.

(51) Int. Cl.
*H05B 3/68* (2006.01)
*H05B 3/06* (2006.01)
*A47J 37/06* (2006.01)

(52) U.S. Cl.
USPC ............................ 219/450.1; 219/524; 99/378

(58) Field of Classification Search
USPC ................... 219/443.1–468.2, 524, 532–541; 99/372–384, 422–427
See application file for complete search history.

(56) References Cited

U.S. PATENT DOCUMENTS

| D77,095 | S | * | 12/1928 | Hurxthal | D7/352 |
| 2,057,501 | A | | 10/1936 | Parr | |
| 2,105,814 | A | * | 1/1938 | Lent | 219/452.13 |
| 2,571,373 | A | | 10/1951 | Massecar | |
| 2,597,541 | A | | 5/1952 | Squires | |
| 2,663,249 | A | | 12/1953 | Epstein | |
| 2,732,580 | A | | 1/1956 | Schwaneke | |
| 2,765,727 | A | | 10/1956 | Lipsich et al. | |
| 2,830,529 | A | | 4/1958 | Jaffe | |
| 2,881,299 | A | | 4/1959 | Jepson | |
| 2,907,286 | A | | 10/1959 | Ruiz | |
| 3,097,588 | A | | 7/1963 | De Jersey | |
| 3,121,385 | A | | 2/1964 | Funke et al. | |
| 3,215,062 | A | | 11/1965 | Frankenberg | |
| 3,349,724 | A | | 10/1967 | Tavan | |
| 3,373,893 | A | | 3/1968 | Dunkelis | |
| 3,377,942 | A | | 4/1968 | Carbon | |
| 3,427,956 | A | | 2/1969 | Jaffe | |
| 3,503,324 | A | | 3/1970 | Gmeiner | |

(Continued)

FOREIGN PATENT DOCUMENTS

| CN | 2645570 Y | 10/2004 |
| DE | 2623294 A1 | 5/1976 |
| DE | 2929223 A1 | 7/1979 |
| WO | 2007051294 A1 | 5/2007 |

OTHER PUBLICATIONS

"George Foreman GRB72P Platinum 72 Square Inch Platinum Grill," http://reviews.pricegrabber.com/small-kitchen-grills/m/26334832, Retrieved on Jan. 24, 2008.

(Continued)

*Primary Examiner* — Sang Y Paik
(74) *Attorney, Agent, or Firm* — K&L Gates LLP

(57) ABSTRACT

A cooking appliance for producing flatbreads or other foodstuffs is provided. The cooking appliance includes a base, lower heating assembly, and an upper heating assembly. The lower heating assembly includes a lower cooking surface, and the upper heating assembly includes an upper cooking surface. The upper cooking surface is translatable and rotatable relative to the lower cooking surface. The upper cooking surface is locatable in at least three operative positions relative to the lower cooking surface.

18 Claims, 18 Drawing Sheets

(56) References Cited

U.S. PATENT DOCUMENTS

| | | |
|---|---|---|
| 3,559,565 A | 2/1971 | Getz |
| 3,593,652 A | 7/1971 | Lostanien |
| 3,611,912 A | 10/1971 | Choc |
| 3,611,915 A | 10/1971 | Glaser |
| 3,630,140 A | 12/1971 | Marrie |
| 3,682,348 A * | 8/1972 | Roberts .......................... 16/343 |
| 3,714,937 A | 2/1973 | Linstead |
| 3,848,110 A | 11/1974 | Giguere et al. |
| 3,852,569 A | 12/1974 | Potvin |
| 3,938,431 A | 2/1976 | Potvin |
| 3,999,473 A | 12/1976 | Carbon |
| 4,170,933 A | 10/1979 | Meamber |
| 4,280,402 A | 7/1981 | Featherstone |
| 4,321,858 A | 3/1982 | Williams |
| 4,508,025 A | 4/1985 | Schultz |
| 4,583,451 A | 4/1986 | Kangay |
| 4,683,813 A | 8/1987 | Schultz |
| 4,724,755 A | 2/1988 | Escamilla |
| 4,809,450 A | 3/1989 | Hochstrasser et al. |
| 4,838,153 A | 6/1989 | Escamilla et al. |
| 5,095,813 A | 3/1992 | Escamilla et al. |
| 5,355,558 A | 10/1994 | Vertanen |
| 5,363,748 A | 11/1994 | Boehm et al. |
| 5,380,986 A | 1/1995 | Mullen |
| 5,394,590 A | 3/1995 | Yu |
| 5,429,110 A | 7/1995 | Burke et al. |
| 5,481,963 A | 1/1996 | Sesona et al. |
| 5,546,850 A | 8/1996 | Zaveri |
| 5,570,625 A | 11/1996 | Liebermann |
| 5,606,905 A | 3/1997 | Boehm et al. |
| 5,617,840 A | 4/1997 | Clifford |
| 5,630,358 A | 5/1997 | Patel |
| 5,642,658 A | 7/1997 | Liebermann |
| 5,694,834 A | 12/1997 | Le Dall et al. |
| 5,701,804 A | 12/1997 | Liebermann |
| 5,716,657 A | 2/1998 | Liebermann |
| 5,800,844 A | 9/1998 | Raio et al. |
| 5,934,182 A | 8/1999 | Harter et al. |
| 5,996,476 A | 12/1999 | Schultz |
| 6,016,741 A | 1/2000 | Tsai et al. |
| 6,089,144 A | 7/2000 | Garber et al. |
| 6,125,740 A | 10/2000 | Hedrington et al. |
| 6,202,544 B1 | 3/2001 | Martinez |
| D439,792 S | 4/2001 | Hedrington et al. |
| 6,329,007 B1 | 12/2001 | Khusro |
| 6,369,366 B1 * | 4/2002 | Mullen ...................... 219/450.1 |
| 6,427,581 B1 | 8/2002 | Wu |
| 6,443,054 B1 | 9/2002 | McCarney |
| 6,549,818 B1 | 4/2003 | Ali |
| 6,555,795 B2 * | 4/2003 | Glucksman et al. ....... 219/450.1 |
| 6,608,292 B1 * | 8/2003 | Barnes .......................... 219/730 |
| 6,701,577 B1 | 3/2004 | Yeh |
| 6,813,575 B2 | 11/2004 | Laflamme |
| D500,629 S | 1/2005 | Huggler et al. |
| 6,860,191 B2 | 3/2005 | Jackson et al. |
| 6,889,602 B2 | 5/2005 | Brady et al. |
| 6,967,036 B1 | 11/2005 | Hedrington et al. |
| D522,802 S | 6/2006 | Dreimann et al. |
| D526,154 S | 8/2006 | Dreimann et al. |
| 7,109,442 B2 | 9/2006 | Steinberg et al. |
| D539,596 S | 4/2007 | Dreimann et al. |
| D539,597 S | 4/2007 | Dreimann et al. |
| D540,109 S | 4/2007 | Dreimann et al. |
| 2005/0072311 A1 | 4/2005 | Szymanski |
| 2005/0247210 A1 | 11/2005 | Ragan |
| 2006/0213373 A1 | 9/2006 | Fernandez et al. |
| 2007/0000393 A1 | 1/2007 | Lam |
| 2007/0006740 A1 | 1/2007 | Lam |
| 2007/0186758 A1 | 8/2007 | Kim et al. |
| 2007/0221653 A1 | 9/2007 | Krishnan |

OTHER PUBLICATIONS

United Kingdom Search Report corresponding to United Kingdom Search Report No. UK0906830.5 dated Aug. 18, 2009.

Chinese Office Action for Chinese Application 200910149746.8, dated Nov. 1, 2013.

* cited by examiner

US 8,692,164 B2

COOKING APPLIANCE

PRIORITY CLAIM

This application is a non-provisional of, and claims priority to and the benefit of, U.S. Provisional Patent Application Ser. No. 60/781,837, filed Mar. 13, 2006.

BACKGROUND

Flatbreads have become increasingly popular as various ethnic foods enter the mainstream, particularly, mass-produced ethnic foods such as tacos, burritos, tortillas, pizzas, pitas, dosas, naan, pizzelles, crepes, pancakes, krumkakes, and the like. As these foods become more popular, more consumers desire the ability to make their own flatbreads by using a household cooking appliance that may reproduce nearly authentic flatbreads in their own homes. Typical preparation of flatbreads has been labor-intensive or requires repeated attempts to perfect a style for producing a quality flatbread, which has made appliances for making such flatbreads more desirable by general consumers. Various types of cooking appliances are known in the art, including panini presses, tortilla makers, pancake griddles, and pizzelle makers. Each of these appliances generally includes top and bottom heated plates that compress the flatbread or foodstuff therebetween. The compression of the flatbread or foodstuff between the top and bottom plates aides in the formation of the flatbread to a desired shape such as round, square, or shape having a pre-determined pattern.

Griddles, grills, presses, or other home cooking appliances used to produce flatbreads and other foodstuffs typically involve an upper and lower grilling surface. Tortilla makers, griddle irons, waffle makers, pizzelle presses, and the like, generally involve the upper and lower grilling surfaces pinned together to form a rotational axis about which the upper grilling surface rotates relative to the lower grilling surface. This pivotal movement provides for only two operative positions for the cooking appliance—an open and a closed position. Panini presses generally include upper and lower grilling surfaces wherein the upper grilling surface is connected to the lower grilling surface by a rotatable arm. The arm of the panini press is rotatable about an axis connected to, or adjacent to, the lower grilling surface, and the arm is pivotally connected to the upper grilling surface. The upper grilling surface moves in an arcuate manner relative to the lower grilling surface while keeping the upper grilling surface substantially parallel to the lower grilling surface. The movement of the upper grilling surface provides the panini press with only two operative positions—an open position and a closed position. Because these cooking appliances, as well as most typical cooking appliances, provide only an open and closed operative position, the appliances are generally limited to only a single application or capable of producing only a single type of foodstuff.

SUMMARY

The present disclosure is directed to a cooking appliance, and more particularly to a cooking appliance for producing flatbreads or other foodstuffs.

In an embodiment, a cooking appliance is provided. The cooking appliance includes a first cooking surface and a second cooking surface. The second cooking surface is operatively connected to said first cooking surface. The first cooking surface is locatable in at least three operative positions relative to the second cooking surface.

In another embodiment, a cooking appliance is provided. The cooking appliance includes a first cooking surface and a second cooking surface. The second cooking surface is translatable in a substantially linear manner relative to the first cooking surface.

In another embodiment, a cooking appliance is provided. The cooking appliance includes a base and a lower heating assembly connected to the base. The lower heating assembly includes a substantially flat lower cooking surface. The cooking appliance further includes an upper heating assembly that is operatively connected to the lower heating assembly. The upper heating assembly includes an upper cooking surface, wherein the upper cooking surface has a spiral-shaped raised ridge.

Advantages of the present invention will become more apparent to those skilled in the art from the following description of the preferred embodiments of the invention which have been shown and described by way of illustration. As will be realized, the invention is capable of other and different embodiments, and its details are capable of modification in various respects. Accordingly, the drawings and description are to be regarded as illustrative in nature and not as restrictive.

DETAILED DESCRIPTION

Figure 1:
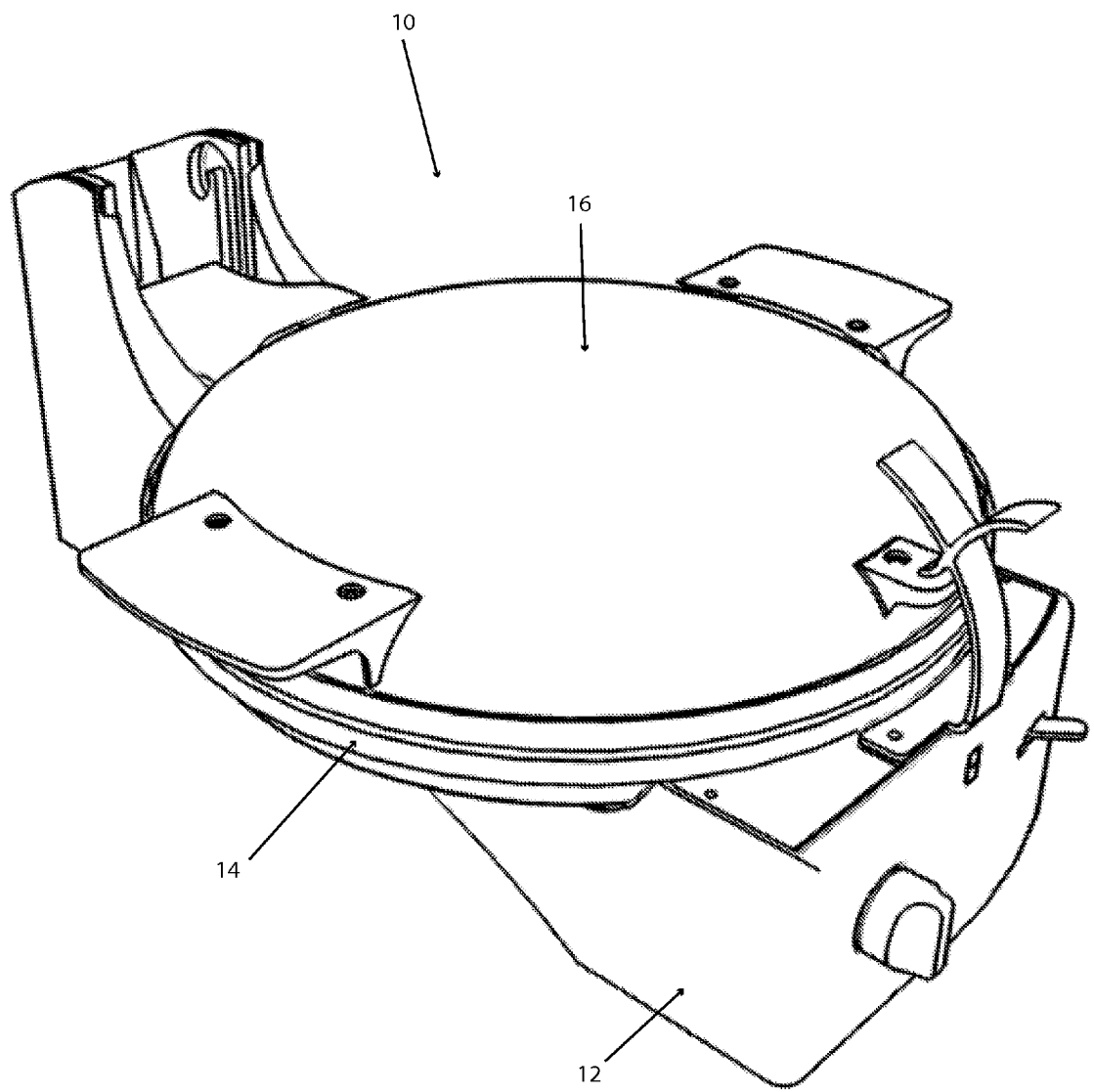
FIG. 1 is a top perspective view of an embodiment of a cooking appliance in accordance with the present disclosure.

Referring to FIG. 1, an embodiment of a cooking appliance 10 is shown. The cooking appliance 10 is a household appliance that may be configured to produce flatbreads or other foodstuffs including, but not limited to, tortillas, crepes, pitas, paninis, pancakes, naan, pizzelles, knaeckebrot, krumkakes, or dosas. In the description below, it should be understood that the terms "flatbread" and "foodstuff" are used for ease of description in a broad sense and in a non-limiting way to include any flatbread, cookie, bread, pastry, sandwich, or any other foodstuff that may be produced using either a single heated surface or a pair of opposing heated surfaces, and the use of these terms is not limited to only substantially flat foodstuffs.

In an embodiment, a cooking appliance 10 includes a base 12, a lower heating assembly 14, and an upper heating assembly 16, as illustrated in FIG. 1. The base 12 provides a solid foundation for the cooking appliance 10, thereby allowing the cooking appliance 10 to be placed on a countertop, tabletop, or any other sufficiently flat and sturdy surface. The base 12 is adapted to provide structural support for the lower heating assembly 14 and the upper heating assembly 16. The base 12 may be formed of plastic, metal, metal in which at least a portion is overmolded with plastic, or any other material sufficient to support the lower and upper heating assemblies 14, 16 as well as provide heat insulation to prevent the user from being burned if the base 12 is touched during operation. In another embodiment, the base 12 may include rubber or plastic feet (not shown) extending downward from the bottom of the base 12, wherein the feet are adapted to provide a cushion between the base 12 and the surface upon which the cooking appliance 10 is located. The feet may also provide a frictional connection between the cooking appliance 10 and the surface against which the base 12 abuts in order to prevent the cooking appliance 10 from sliding relative to the surface. The feet may be formed of plastic, rubber, or any other material sufficient to provide a cushioned spacer and prevent the base 12 from sliding relative to the surface upon which the cooking appliance 10 is placed.

Figure 2:
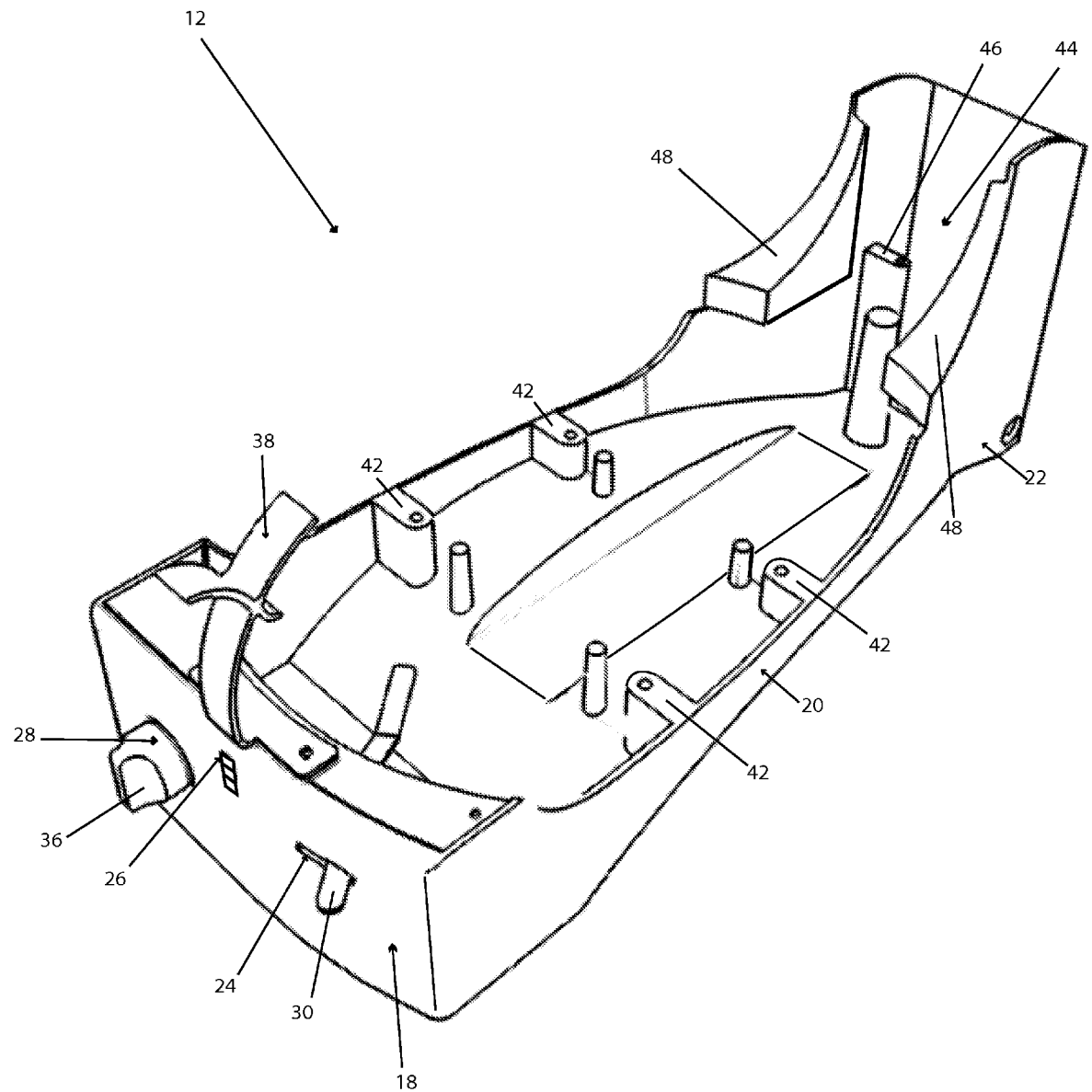
FIG. 2 is a top perspective view of an embodiment of a base.
Figure 3:
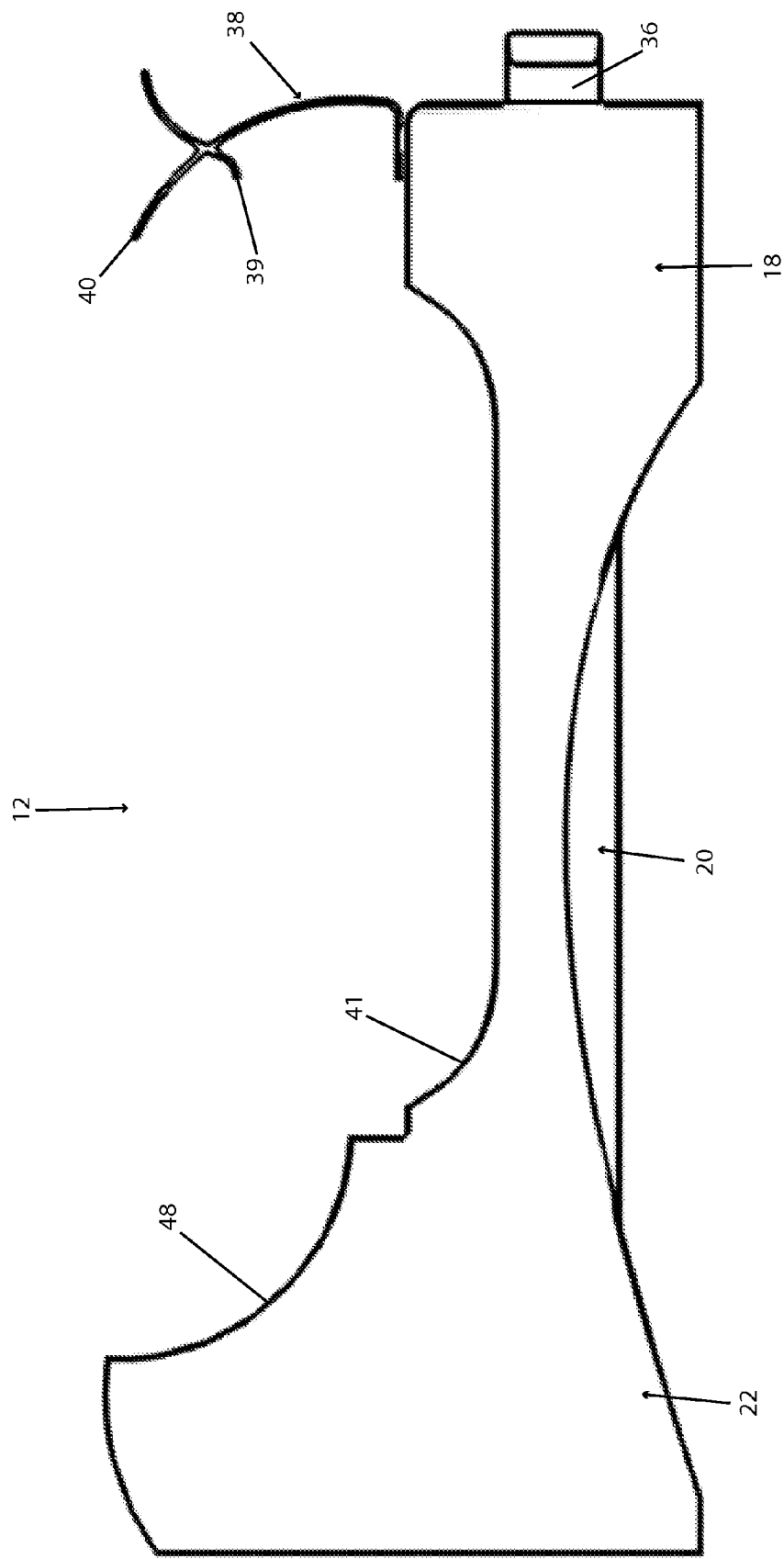
FIG. 3 is a side view of the base of FIG. 2.
Figure 4:
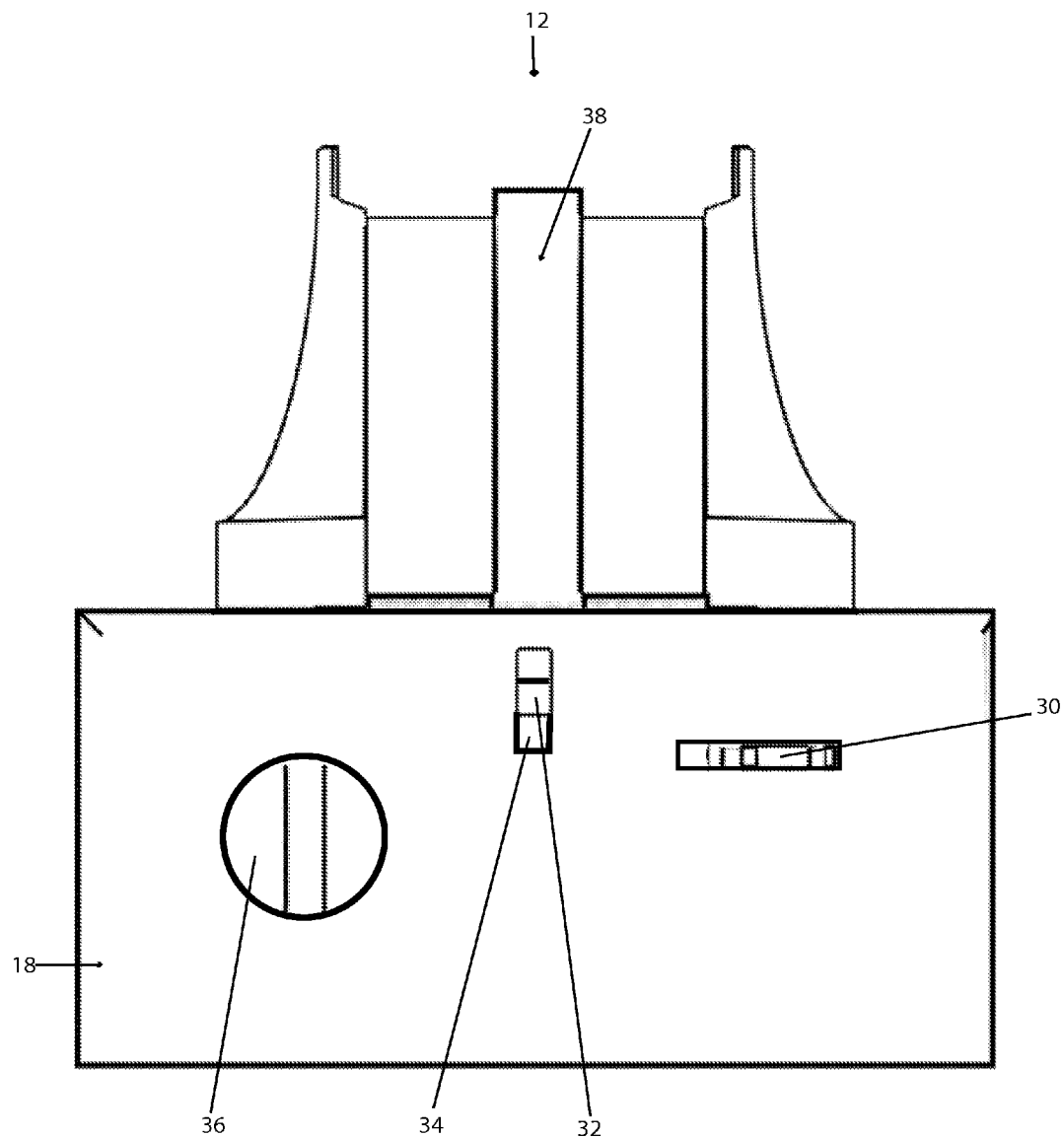
FIG. 4 is a front view of the base of FIG. 2.

In an embodiment, the base 12 is a generally elongated member, as shown in FIGS. 2-5, and includes a front portion 18, a central portion 20, and a rear portion 22. In use, the cooking appliance 10 is generally aligned such that the user faces the front portion 18 of the base 12. The front portion 18 includes controls and indicators, as illustrated in FIG. 4. The front portion 18 includes a temperature control 24, a temperature indicator 26, and a timer control 28. The temperature control 24 allows a user to selectively adjust the temperature of the lower heating assembly 14 and the upper heating assembly 16 either concurrently or individually. The temperature control 24 may allow the user to select an actual temperature or a relative temperature of the lower and upper heating assemblies 14, 16.

In an embodiment, the temperature control 24 includes a sliding mechanism 30 configured to allow the user to selectively increase or decrease the relative temperature of the lower and/or upper heating assemblies 14, 16 of the cooking appliance 10, as illustrated in FIG. 4. The sliding mechanism 30 has a range of movement that corresponds to the upper and lower adjustable temperature range of the lower and upper heating assemblies 14, 16. When the sliding mechanism 30 is placed at one limit, the heating assemblies 14, 16 are at the lowest selectable temperature limit when the sliding mechanism 30 is at the opposite limit, the heating assemblies 14, 16 are at the highest selectable temperature limit. In an embodiment, a single sliding mechanism 30 concurrently controls the temperature of both the lower and upper heating assemblies 14, 16. In another embodiment, the front portion 18 may include a second sliding mechanism (not shown) such that one sliding mechanism is configured to selectively adjust the temperature of the upper heating assembly 16 and the other sliding mechanism is configured to selectively adjust the temperature of the lower heating assembly 14. The sliding mechanism 30 is configured to slide in a substantially horizontal manner, but it should be understood by one skilled in the art that the sliding mechanism 30 may be aligned to slide in a vertical manner or to rotate. The sliding mechanism 30 allows the user to selectively adjust the temperature of the lower and upper heating assemblies 14, 16 in which each position along the sliding mechanism corresponds to an actual temperature within an adjustable temperature range of the cooking appliance 10.

The temperature control 24 may also allow the user to selectively adjust the actual temperature of the lower and upper heating assemblies 14, 16. In an embodiment, the temperature control 24 is a rotatable knob (not shown) in which the knob includes indicia on the front portion 18 of the base 12 that correlates to the actual temperature of the heating assemblies 14, 16. In another embodiment, the temperature control 24 is a switch (not shown) having a plurality of selectable positions wherein each selectable position corresponds to an actual temperature of the heating assemblies 14, 16. In another embodiment, the temperature control 24 is a digital interface (not shown), wherein the user may select a specific temperature of the heating assemblies 14, 16. It should be understood by one skilled in the art that the temperature control 24 may be any mechanism sufficient to allow the user to selectively increase or decrease the actual or relative temperature of the lower and/or upper heating assemblies 14, 16. In another embodiment, the front portion 18 may also include a temperature display (not shown) that provides the actual measured temperature of the lower and upper heating assemblies 14, 16. Such a temperature display may be separate from, or integrated with, the temperature control 24.

The front portion 18 of the base 12 further includes a temperature indicator 26, as shown in FIG. 2. In an embodiment, the temperature indicator 26 includes a red LED 32 and a green LED 34, as shown in FIG. 4. The red LED 32 and the green LED 34 are connected to a temperature control circuit (not shown). The temperature control circuit receives a signal from the temperature control 24 indicating the temperature selected by the user and a signal representing the temperature of the lower and upper heating assemblies 14, 16. The temperature control circuit also includes a comparator that determines if the measured temperature of the lower and upper heating assemblies is above, below or equal to the temperature selected by the user. When the cooking appliance 10 is plugged into an outlet, the red LED 32 remains lit. If the measured temperature is equal to or above the temperature selected by the user, the temperature control circuit provides an output signal to illuminate the green LED 34 in addition to the red LED 32 which remains illuminated, thereby indicating that the cooking appliance 10 is heated to the selected temperature and ready for use.

In another embodiment, the temperature indicator 26 is a single LED that indicates when the lower and upper heating assemblies 14, 16 have reached the user-selected temperature. In an embodiment, the single LED may receive an output signal from the temperature control circuit to illuminate the single LED only when the measured temperature is below the temperature selected by the user. In the alternative, the single LED may receive an output signal from the temperature control circuit to illuminate the single LED only when the measured temperature is equal to or above the temperature selected by the user. In another embodiment, the temperature indicator 26 may produce an audible sound to indicate when the measured temperature is equal to the temperature selected by the user to indicate that the lower and upper heating assemblies 14, 16 have been sufficiently preheated. It should be understood by one skilled in the art that the temperature indicator 26 may provide visual or audible indicators either alone or in combination to indicate various temperatures, including but not limited to the temperature selected by the user, of the lower and upper heating assemblies 14, 16.

In an embodiment, the front portion 18 of the base 12 includes a timer control 28, as illustrated in FIG. 2. The timer control 28 may include a rotatable knob 36, as shown in FIG. 4, which provides a timer for the cooking appliance 10. The knob 36 is operatively connected to a bell (not shown), or other audible source, located on the rear surface of the front portion 18. The knob 36 is rotatable between a stop position and a timing position. The timer control 28 can be controlled by a knob or any other mechanical or electrical timing means known in the art.

The front portion 18 of the base 12 also includes a lower latch member 38 attached thereto, as shown in FIGS. 2 and 3. The lower latch member 38 includes a securing member 39 and a stabilizing member 40. The lower latch member 38 extends upwardly from the base 12. The lower latch member 38 is configured to engage the upper heating assembly 16, as will be discussed below.

The central portion 20 of the base 12 includes a recessed region 41 adapted to receive the lower heating assembly 14, as shown in FIG. 3. The recessed region 41 is formed as substantially the same shape as the bottom surface of the lower heating assembly 14 such that the lower heating assembly 14 can fit within the recessed region 41. The recessed region 41 also includes a plurality of bosses 42 (FIG. 2) that are adapted to allow the lower heating assembly 14 to be attached to the base 12.

The rear portion 22 of the base 12 includes a receiving region 44 adapted to receive the rear portions of the lower and upper heating assemblies 14, 16, as shown in FIG. 2. The receiving region 44 includes a pair of lugs 46 located on the inner surface of the receiving region 44. The lugs 46 are adapted to receive and support the hinge mechanism between the lower and upper heating assemblies 14, 16. The receiving region 44 further includes a pair of curved surfaces, or stop members 48, configured to selectively position the upper heating assembly 16 when in operation or otherwise. The rear portion 22 of the base 12 includes a substantially flat rear surface that allows the entire cooking appliance 10 to be stored in an upright position on the flat rear surface of the base 12.

Figure 5:
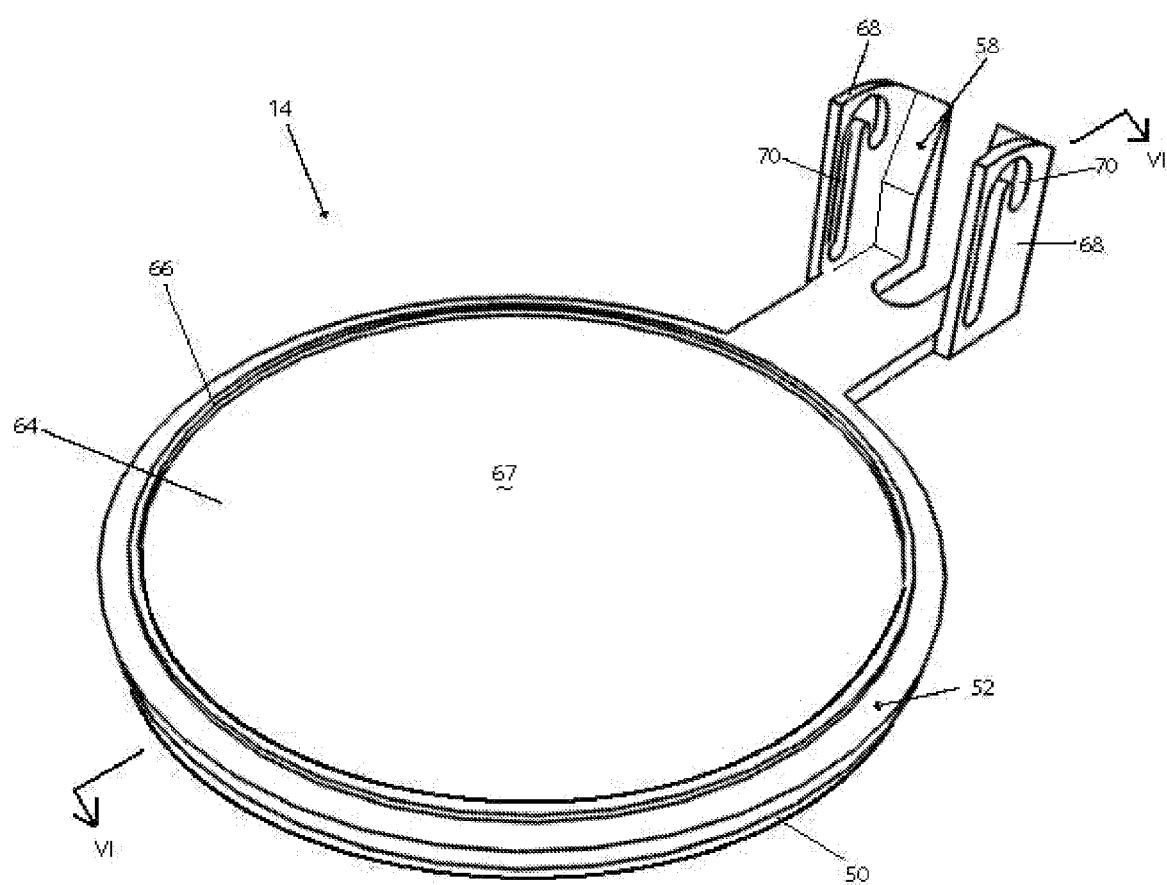
FIG. 5 is a top perspective view of an embodiment of a lower heating assembly.
Figure 6:
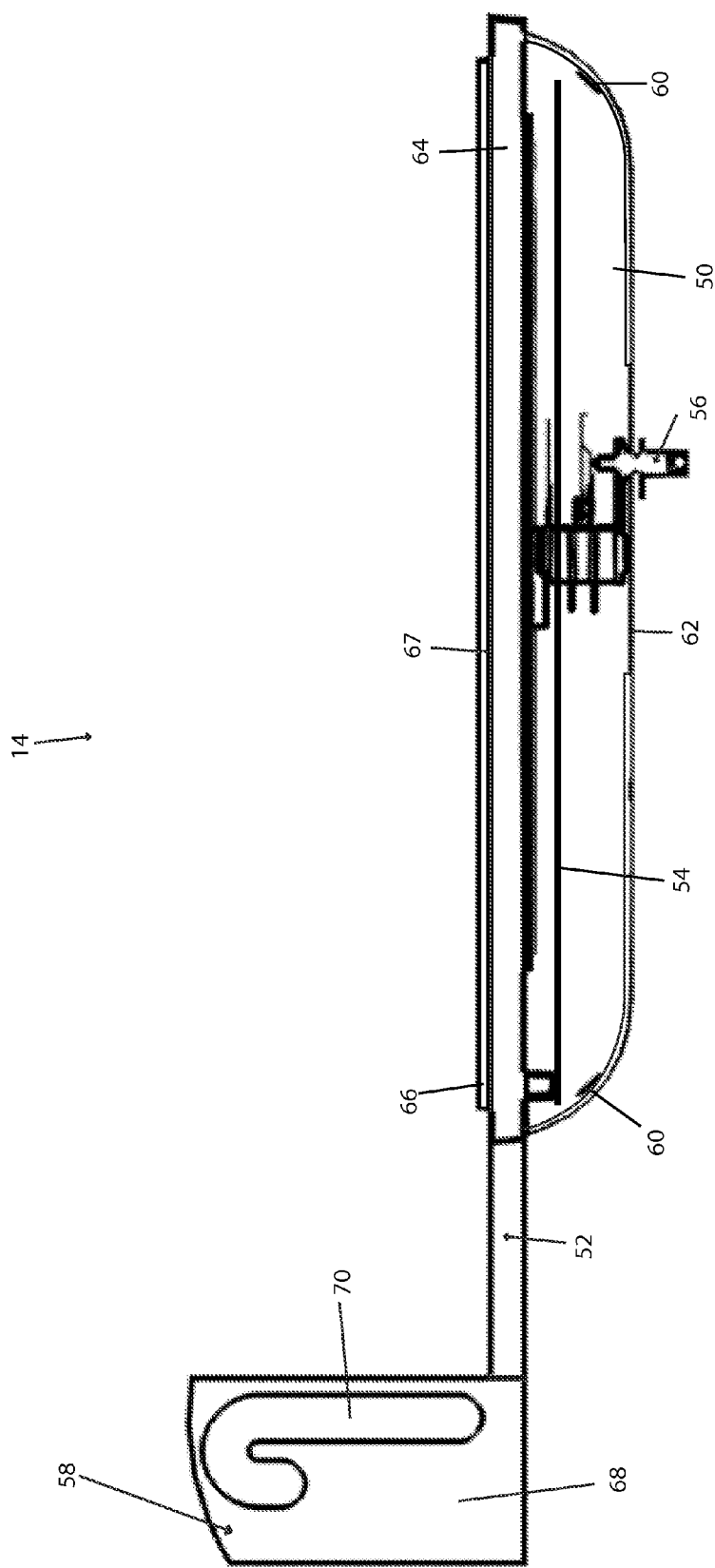
FIG. 6 is a cross-sectional view of the lower heating assembly along line VI-VI of FIG. 5.

Referring to FIGS. 5 and 6, the lower heating assembly 14 of the cooking appliance 10 is shown. In an embodiment, the lower heating assembly 14 includes a lower cover 50, lower heating member 52, lower insulator 54, lower thermostat assembly 56, and a hinge guide 58. The lower cover 50 is adapted to be received in the recessed region 41 of the base 12. The lower cover 50 may be formed of injection molded plastic, metal, ceramic, or any other material sufficient to provide protection to the lower heating member 52 of the lower heating assembly 14. In an embodiment, the lower cover 50 is formed of stainless steel. The lower cover 50 includes a plurality of apertures 60 formed therethrough. The apertures 60 formed in the upwardly-curved surfaces of the lower cover 50 are adapted to receive a connecting mechanism (not shown) for connecting the lower cover 50 to the lower heating member 52 and the lower insulator 54. The lower cover 50 includes a cut-out 62 that is adapted to receive the lower thermostat assembly 56 that extends upwardly from the lower cover 50 to the lower heating member 52. The lower cover 50 is formed as an upwardly-directed bowl-shaped member. In an embodiment, the lower cover 50 has a round shape, but it should be understood by one skilled in the art that the lower cover 50 can have any shape sufficient to be received in the recessed region 41. The shape of the lower cover 50 is sufficiently similar to the lower heating member 52 such that the lower cover 50 covers a substantial portion of the downwardly-directed surface of the lower heating member 52.

The lower heating assembly 14 includes a lower insulator 54 disposed between the lower cover 50 and the lower heating member 52, as illustrated in FIG. 6. A lower heating element (not shown) is disposed adjacent to the lower heating member 52 between the lower insulator 54 and the lower heating member 52. The lower heating element is controlled by the lower thermostat assembly 56. The lower insulator 54 may be formed of ceramic, fiberglass, mineral fabric, or non-asbestos insulation. In an embodiment, the lower insulator 54 is formed of glass reinforced plastic. It should be understood by one skilled in the art that the lower insulator 54 may be formed of any material sufficient to insulate the lower cover 50 from the lower heating member 52 to prevent the lower cover 50 from deforming as a result of the heat from the lower heating member 52. In an embodiment, the lower insulator 54 is located in a spaced-apart relationship relative to the bottom surface of the lower heating member 52 and the upper surface of the lower cover 50 to provide a gap therebetween. In an embodiment, the outer edge of the lower insulator 54 is spaced apart from the upwardly-directed surface of the lower cover 50. In another embodiment, the outer edge of the lower insulator 54 is in an abutting relationship with the upwardly-directed surface of the lower cover 50.

In an embodiment, the lower heating member 52 includes a lower cooking plate 64 and the hinge guide 58 that are formed as a unitary member, as illustrated in FIGS. 5 and 6. In another embodiment, the lower cooking plate 64 and the hinge guide 58 are formed as separate members that are thereafter connected to each other in a substantially rigid manner. In another embodiment, the lower cooking plate 64 and the hinge guide 58 are formed as separate members that are thereafter releasably connected to each other, thereby allowing the lower cooking plate 64 to be removed from said hinge guide 58 for disassembly. The lower heating assembly 14 is adapted to receive the lower thermostat assembly 56, and the lower thermostat assembly 56 is configured to control the cooking temperature of the lower cooking plate 64. In an embodiment, the lower cooking plate 64 is a substantially circular member with a radius of between about eight (8) inches to fourteen (14) inches (20.3 to 35.6 cm). It should be understood by one skilled in the art that the lower cooking plate 64 may be round, square, triangular, rectangular, oval, or any other shape sufficient to provide a heated cooking surface. The lower cooking plate 64 may be made of a substantially non-stick material, or the lower cooking plate 64 may include a non-stick surface added to the upwardly-directed surface.

In an embodiment, the lower heating member 52 includes a raised edge 66 that is spaced radially inward from the outer edge of the lower cooking plate 64, as shown in FIGS. 5 and 6. The raised edge 66 extends upwardly from the upper surface of the lower cooking plate 64, and the raised edge 66 is adapted to be in an abutting relationship with the upper heating assembly 16 when the cooking appliance 10 is in an operative position, as will be discussed below. During operation, the batter or mixture used to form a flatbread or other foodstuff is poured or placed onto the lower cooking surface 67 within the volume enclosed by the raised edge 66. The raised edge 66 is configured to contain the batter therewithin to prevent spillage if the user pours too much batter onto the lower cooking plate 64. In an embodiment, the lower cooking plate 64 may include a detent, or channel (not shown), located radially outwardly from the raised edge 66 but radially inward from the outer edge of the cooking plate 64. The channel is adapted to receive excess batter not contained within the raised edge 66. The channel provides a secondary device for preventing excess batter from spilling out from the lower heating assembly 14.

In an embodiment, the lower cooking surface 67 enclosed within the raised edge 66 has a substantially flat pattern, as shown in FIG. 5. The flat lower cooking surface 67 provides a cooked flatbread with a flat bottom surface similar to a traditionally-made flatbread. Flatbreads such as a tortilla, pita, dosa, crepe, pancake, and the like, typically have a flat bottom surface. In another embodiment, the lower cooking surface 67 enclosed within the raised edge 66 may include an alternative pattern for flatbreads that typically have a patterned bottom surface. Foodstuffs such as knaeckebrot, krumkakes, pizzelles, paninis, and the like, typically have patterned bottom surfaces. The patterned lower cooking surface 67 may be flat for tortillas, or have substantially parallel ridges for paninis, rounded and raised projections for knaeckebrot, or an ornate design for pizzelles and krumkakes. In an embodiment, the lower heating member 52 is removable and interchangeable such that the user may remove or replace the lower heating member 52 having a flat lower cooking surface 67 with a lower heating member 52 having a different patterned lower cooking surface 67. In another embodiment, the lower cooking plate 64 is releasably connected to the hinge guide 58 so the lower cooking plate 64 can be removed and replaced with another lower cooking plate 64 having a different pattern on the lower cooking surface 67. Additionally, the lower heating member 52 having a flat lower cooking surface 67 with a raised edge 66 of a first height may be removed and replaced with a raised edge 66 having a second height, wherein the second height of the raised edge 66 may be greater than or less than the first height of the raised edge 66. The lower heating member 52 with the raised edge 66 having the first height produces a foodstuff with a first thickness, and the lower heating member 52 with the raised edge 66 having the second height produces a foodstuff with a thickness different than the first thickness. The user may replace the lower heating member 52 to selectively adjust the thickness or the pattern of the foodstuff produced between the lower and upper heating members 52, 74.

In an embodiment, the lower heating member 52 includes a hinge guide 58 integrally formed therewith, as illustrated in FIGS. 5 and 6. The hinge guide 58 extends from the lower cooking plate 64. In an embodiment, the hinge guide 58 includes a pair of opposing support members 68, and each support member 68 has a track 70 formed through the thickness. The opposing tracks 70 are configured to receive a hinge pin connected to the upper heating assembly 16. The support members 68 are received in the receiving region 44 of the base 12. The support members 68 are disposed atop the lugs 46 (FIG. 2) of the base 12, and the lower heating member 52 receives a plurality of connecting mechanisms that secure the lower heating member 52 to the base 12.

In an embodiment, the track 70 formed through each support member 68 forms the shape of a shepherd's staff, or an inverted J-shape, as shown in FIGS. 5 and 6. The track 70 includes a substantially linear portion and an arced portion extending from the substantially linear portion. The arced portion has a substantially semicircular shape. The substantially linear portion extends in a substantially perpendicular manner relative to the cooking surface of the lower cooking plate 64. In an embodiment, the tracks 70 are formed through the thickness of the support members 68, thereby allowing the upper heating assembly 16 to be easily removed from the lower heating assembly 14. In another embodiment, the tracks 70 are formed through a portion of the thickness of the opposing support members 68. The tracks 70 are configured to allow the upper heating assembly 16 to rotate, translate, or a combination of rotation and translation relative to the lower heating assembly 14.

Figure 6A:
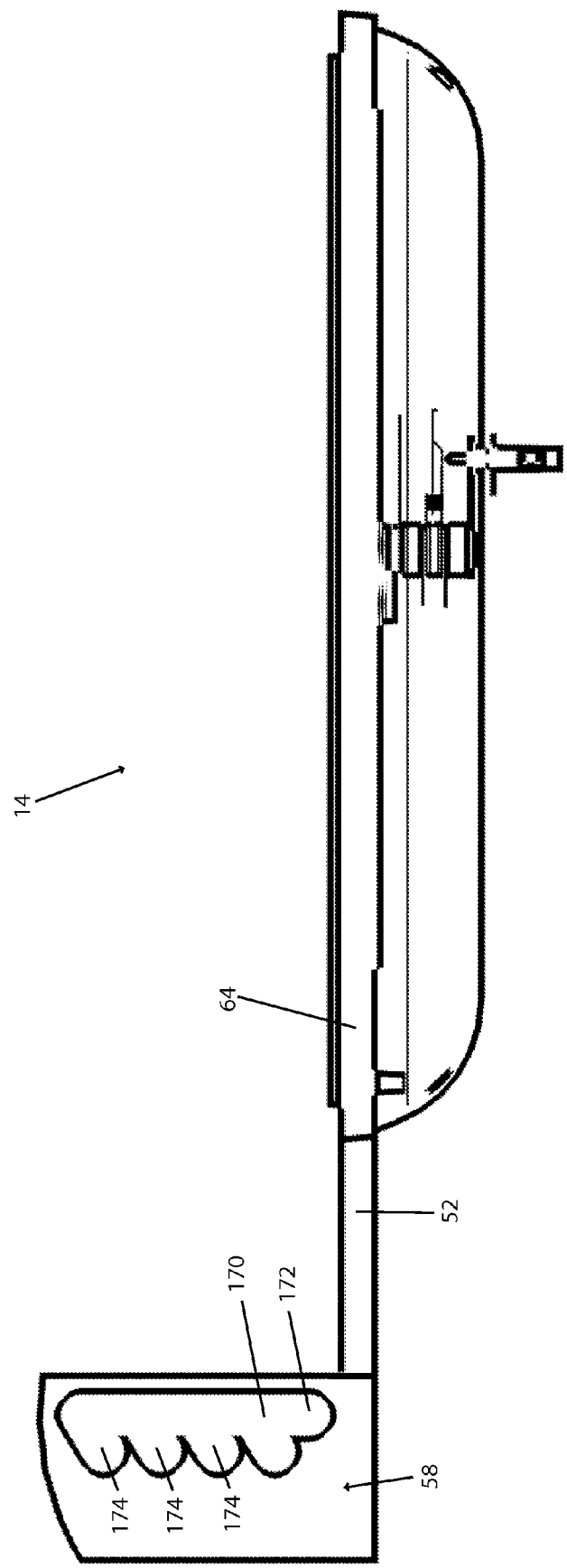
FIG. 6A is a cross-sectional view of another embodiment of a lower heating assembly.

In another embodiment, the hinge guide 58 includes a pair of opposing tracks 170, as shown in FIG. 6A. The tracks 170 include a substantially linear portion 172 extending in a substantially normal manner with respect to the lower cooking plate 64. A plurality of notches 174 extend from the linear portion 172 of the tracks 170. The notches 174 are adapted to receive the hinge pin 102 of the upper heating assembly 16 to selectively locate and secure the upper heating assembly 16 in a plurality of operative positions. The notches 174 may extend rearward from the linear portion 172 at an angle. In another embodiment, the notches 174 may extend rearwardly from the linear portion 172 of the tracks 170 in a substantially parallel manner. It should be understood by one skilled in the art that the notches 174 may extend from the linear portion 172 of the tracks 170 forwardly, rearwardly, or a combination thereof in an alternating or random manner. In another embodiment, the notches 174 may be oriented in a spaced-apart manner.

Figure 7:
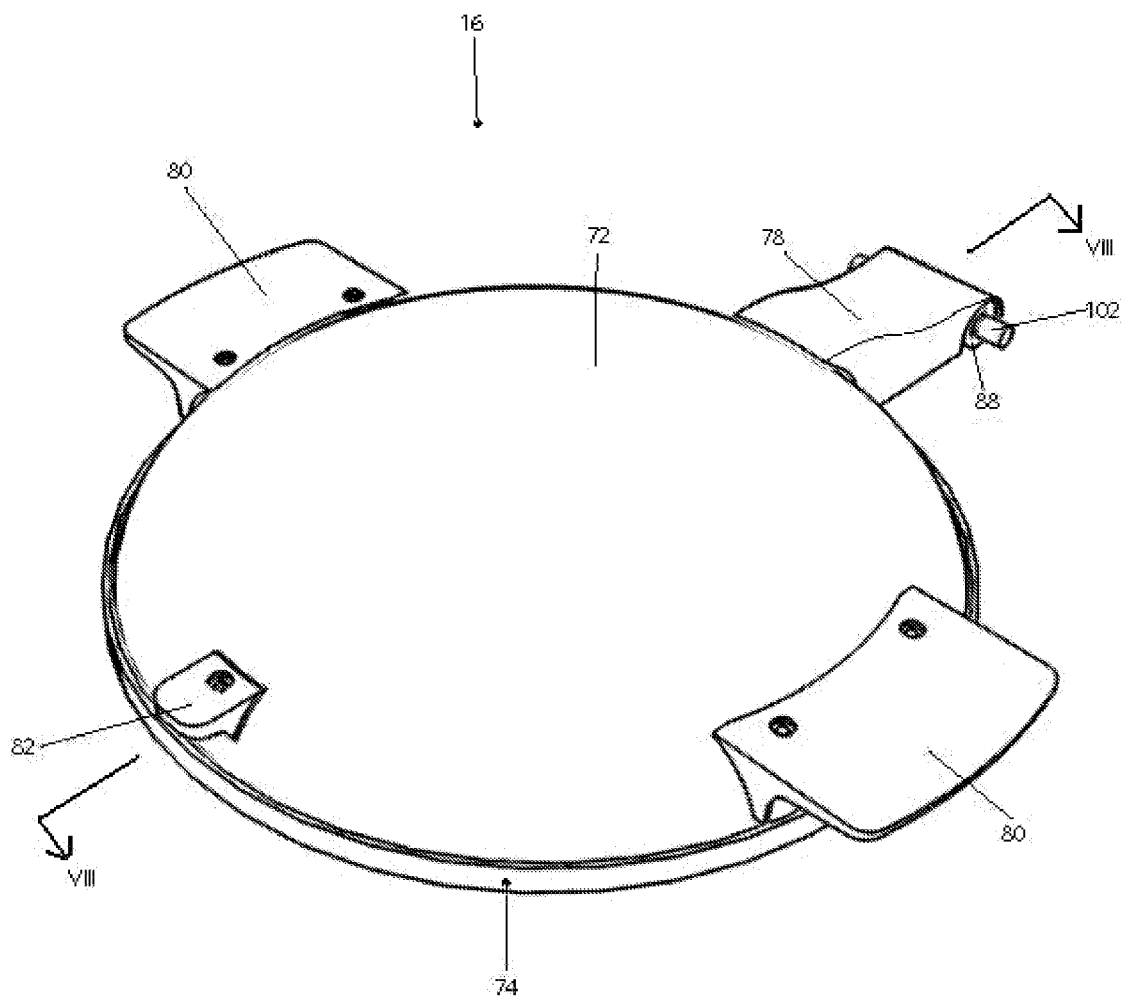
FIG. 7 is a top perspective view of an embodiment of an upper heating assembly.
Figure 8:
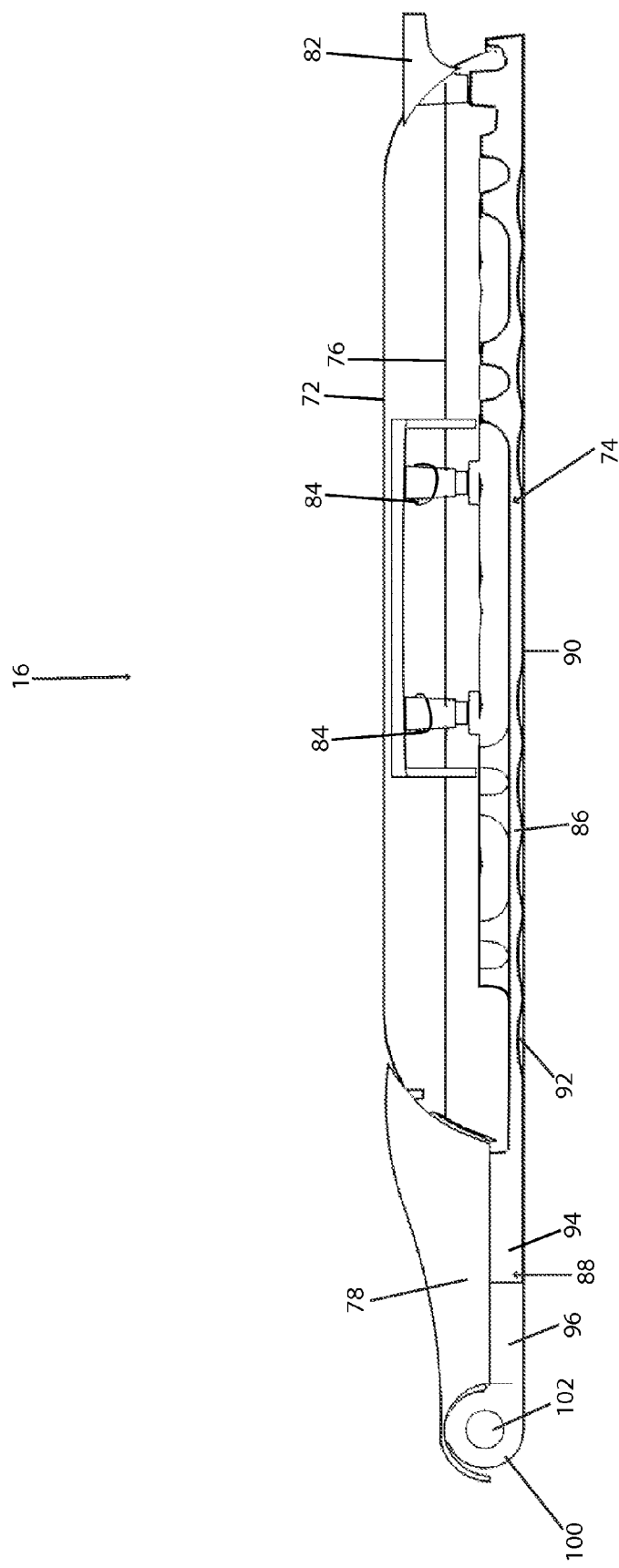
FIG. 8 is a cross-sectional view of the upper heating assembly along line VIII-VIII of FIG. 7.
Figure 9:
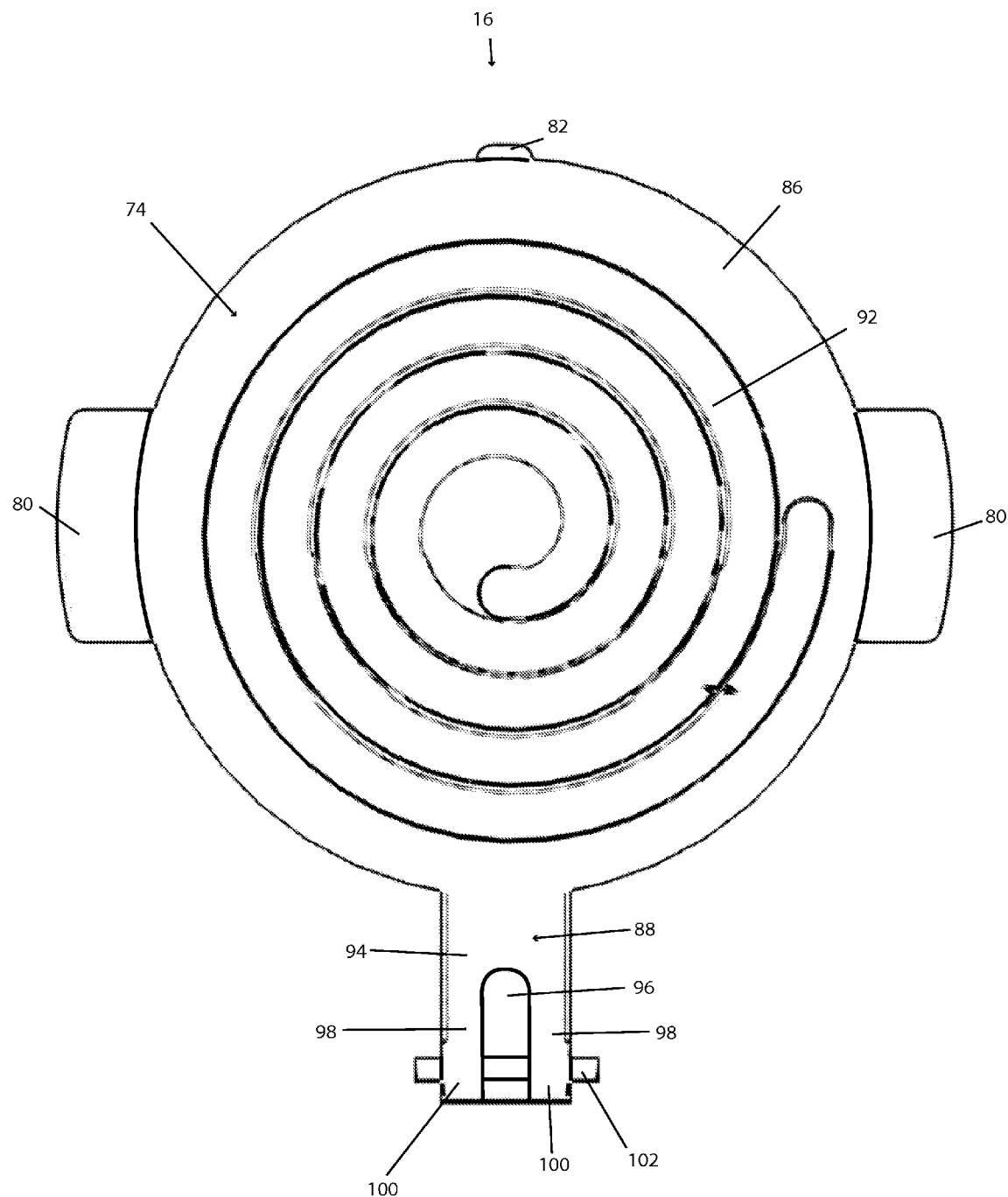
FIG. 9 is a bottom view of the upper heating assembly of FIG. 7.

Referring to FIGS. 7 to 9, an embodiment of the upper heating assembly 16 is shown. In an embodiment, the upper heating assembly 16 includes an upper cover 72, upper heating member 74, upper insulator 76, hinge cover 78, a pair of handles 80, and an upper latch member 82. The upper cover 72 may be formed of injection molded plastic, metal, ceramic, or any other material sufficient to provide protection to the upper heating member 74 of the upper heating assembly 16. In an embodiment, the upper cover 72 is formed of stainless steel. The upper cover 72 may be formed from the same mold or stamping as the lower cover 50 such that the lower and upper heating assemblies 14, 16 have a similar shape, or in the alternative, the upper cover 72 may be formed differently than the lower cover 50. The upper cover 72 includes a plurality of apertures 84 formed therethrough. The apertures 84 are adapted to receive a connecting mechanism (not shown) for connecting the handles 80, the upper heating member 74, and the upper insulator 76 to the upper cover 72. The upper cover 72 is formed as a downwardly-directed bowl-shaped member. In an embodiment, the upper cover 72 has a substantially round shape, but it should be understood by one skilled in the art that the upper cover 72 may have any shape similar to the shape of the lower cover 50. The shape of the upper cover 72 is sufficiently similar to the upper heating member 74 such that the upper cover 72 covers a substantial portion of the upwardly-directed surface of the upper heating member 74.

In an embodiment, the upper heating assembly 16 includes a pair of opposing handles 80 attached to the upper cover 72, as illustrated in FIG. 7. The handles 80 extend laterally from opposing sides of the cover 72. The handles 80 allow the user to lift the upper heating assembly 16 relative to the lower heating assembly 14. The upper heating assembly 16 also includes an upper latch member 82 attached to the upper cover 72, as shown in FIG. 7. The upper latch member 82 is configured to engage to the lower latch member 38 connected to the base 12 to secure the upper heating assembly 16 when the cooking appliance 10 is in an operative position.

In an embodiment, the upper heating assembly 16 includes an upper insulator 76 disposed between the upper cover 72 and the upper heating member 74, as illustrated in FIG. 8. The upper insulator 76 may be formed of ceramic, fiberglass, mineral fabric, or non-asbestos insulation. In an embodiment, the upper insulator 76 is formed of glass reinforced plastic. It should be understood by one skilled in the art that the upper insulator 76 may be formed of any material sufficient to insulate the upper cover 72 from the upper heating member 74 to prevent the upper cover 72 from deforming as a result of the heat from the upper heating member 74. In an embodiment, the upper insulator 76 is located in a spaced-apart relationship relative to the top surface of the upper heating member 74 and the bottom surface of the upper cover 72 to provide a gap therebetween. An upper heating element (not shown) is located adjacent to the upper heating member 74 between the upper insulator 76 and the upper heating member 74. In an embodiment, the upper heating element is controlled by an upper thermostat assembly (not shown). In another embodiment, the temperature of the upper heating element is controlled by the lower thermostat assembly 56. In an embodiment, the outer edge of the upper insulator 76 is spaced apart from the downwardly-directed surface of the upper cover 72. In another embodiment, the outer edge of the upper insulator 76 is in an abutting relationship with the downwardly-directed surface of the upper cover 72.

In an embodiment, the upper heating member 74 includes an upper cooking plate 86 and a hinge member 88 formed together as a unitary member, as illustrated in FIGS. 7 to 9. In another embodiment, the upper cooking plate 86 and the hinge member 88 are formed as separate members and thereafter connected to each other in a substantially rigid manner. In yet another embodiment, the upper heating member 74 includes an upper cooking plate 86 releasably connected to the hinge member 88. In an embodiment, the upper cooking plate 86 is a substantially circular member with a radius of between about eight (8) inches to fourteen (14) inches (20.3-35.6 cm). In an embodiment, the upper cooking plate 86 is generally the same size and shape as the opposing lower cooking plate 64. It should be understood by one skilled in the art that the upper cooking plate 86 may be round, square, triangular, rectangular, oval, or any other shape sufficient to provide a heated cooking surface. In an embodiment, the lower thermostat assembly 56 controls the temperature of the lower and upper cooking surfaces 67, 90. In another embodiment, the temperature of the lower cooking surface 67 is controlled by the lower thermostat assembly 56 and the temperature of the upper cooking surface 90 is controlled by an upper thermostat assembly (not shown). The upper cooking plate 86 may be made of a substantially non-stick material, or the upper cooking plate 86 may include a non-stick surface added to the downwardly-directed upper cooking surface 90.

In an embodiment, the upper heating member 74 includes a detent, or channel (not shown), spaced radially inwardly from the outer edge of the upper cooking plate 86. The channel extends inwardly from the upper cooking surface 90 of the upper cooking plate 86, and the channel is adapted to receive the corresponding raised edge 66 of the lower heating member 52. In another embodiment, the upper heating member 74 includes a substantially flat surface such that when the lower and upper heating members 52, 74 are in an abutting relationship, the raised edge 66 of the lower heating member 52 is abutting the flat surface of the upper heating member 74. In yet another embodiment, the upper heating member 74 includes a corresponding raised edge (not shown) that extends downwardly from the upper cooking surface 90 such that the raised edges of the lower and upper cooking members 52, 74 are in an abutting relationship when the upper heating member 74 is lowered to a position adjacent to the lower heating member 52.

In an embodiment, the upper cooking surface 90 includes a raised ridge 92 having a spiral shape, as shown in FIG. 9. In one application, the cooking appliance 10 may be used to cook a dosa. A dosa is a traditional Asian Indian flatbread in which batter is placed on a flat heated cooking surface by a ladle that is swirled around to distribute the batter somewhat evenly across the cooking surface. The swirl formation produced by the ladle is often associated or identified with a homemade dosa. The spiral-shaped raised ridge 92 simulates the swirl formation from a ladle in order to produce a dosa that appears to be homemade by using the cooking appliance 10. In another application, the cooking appliance 10 may be used to cook other foodstuffs such as a tortilla, pita, crepe, pancake, and the like, typically have a flat upper surface. In making these foodstuffs, the pattern of both the lower and upper cooking surfaces 67, 90 is flat in order to produce a foodstuff having a flat upper surface. Batter or dough is placed on the lower cooking surface 67, the upper heating assembly 16 is closed such that the upper cooking surface 90 presses the batter or dough out to fill the volume within the raised edge 66 on the lower cooking surface 67, and the lower and upper cooking surfaces 67, 90 produce a foodstuff having flat top and bottom surfaces. In other applications, the cooking appliance 10 may also be used to cook a panini, pizzelie, krumkake, knaeckebrot, or other foodstuff having a patterned top and/or bottom surface in which the top surface, bottom surface, or both top and bottom surfaces have a pattern that is not substantially flat. For example, the patterned lower and upper cooking surface 67, 90 may include substantially parallel ridges for paninis, rounded and raised projections for knaeckebrot, or an ornate design for pizzelles and krumkakes.

In an embodiment, the lower and upper cooking surfaces 67, 90 have the same pattern. In another embodiment, the lower and upper cooking surfaces 67, 90 have different patterns. In an embodiment, the upper heating member 74 is removable and interchangeable such that the user may remove or replace the upper heating member 74. In another embodiment, the upper cooking plate 86 is releasably connected to the hinge member 88 such that the upper cooking plate 86 can be removed and replaced with another upper cooking plate 86 having a different pattern on the upper cooking surface 90. The removable lower and upper heating members 52, 74 allow the user to use the cooking appliance 10 for a variety of different applications to produce different types of foodstuffs corresponding to the different lower and upper heating members 52, 74.

In an embodiment, the upper heating assembly 16 includes a hinge member 88 that extends from the upper cooking plate 86, as shown in FIGS. 7 to 9. A hinge cover 78 is disposed adjacent to the hinge member 88 in order to protect the hinge member 88 during operation. The hinge member 88 includes an elongated bridge 94 extending rearward from the upper cooking plate 86 in a substantially lateral manner. The bridge 94 has a U-shaped cut-out 96 extending from the distal end of the bridge 94 toward the upper cooking plate 86. The U-shaped cut-out 96 forms a pair of opposing legs 98. A substantially cylindrical boss 100 is formed at the distal end of each leg 98 of the bridge 94. The cylindrical bosses 100 are configured to receive a hinge pin 102 that extends between and beyond each of the cylindrical bosses 100. The hinge pin 102 is received by the opposing tracks 70 of the hinge guide 58, thereby operatively connecting the upper heating assembly 16 to the lower heating assembly 14 and allowing the upper heating assembly 16 to be selectively adjusted relative to the lower heating assembly 14. In an embodiment, the hinge pin 102 is a solid cylindrical rod that extends between the opposing tracks 70 such that the opposing distal ends of the hinge pin 102 are maintained within the hinge guide 58 by the receiving region 44 of the base 12 when each track 70 is formed through the thickness of the corresponding support member 68. In another embodiment, the hinge pin 102 is a two-piece telescoping rod (not shown) having a spring located within the opposing two pieces, thereby biasing each of the telescoping rods outwardly to contact the opposing tracks 70 when each track 70 is formed through only a portion of the thickness of the corresponding support member 68. In another embodiment, the hinge pin 102 is a solid elongated member having a square cross-section. It should be understood by one skilled in the art that the hinge pin 102 can have any cross-sectional shape sufficient to allow the hinge pin 102 to travel between the limits of the opposing tracks 70. In an embodiment, the hinge member 88 and the upper cooking plate 86 are formed as a unitary member. In another embodiment, the hinge member 88 and the upper cooking plate 86 are formed as different members that are then attachable in a substantially rigid manner. In yet another embodiment, the hinge member 88 and the upper cooking plate 86 are formed as different members that are then releasably connected to each other.

The hinge pin 102 is removable from the tracks 70, thereby allowing the upper heating assembly 16 to be removably attachable to the lower heating assembly 14. The hinge pin 102 is also configured to translate along the tracks 70 formed in the hinge guide 58 of the lower heating assembly 14. The hinge pin 102 allows the upper heating assembly 16 to translate in a substantially vertical manner relative to the lower heating assembly 14, wherein the upper cooking surface 90 may be maintained in a substantially parallel relationship relative to the lower cooking surface 67. The hinge pin 102 also allows the upper heating assembly 16 to rotate about the axis formed by the hinge pin 102 located in an angled position relative to the lower cooking surface 67.

In an embodiment, the cooking appliance 10 may be disassembled for ease of cleaning or repair. The upper heating assembly 16 may be detached from the lower heating assembly 14 by removing the hinge pin 102 from the hinge guide 58. The lower heating assembly 14 may then be removed from the base 12 by releasing the fastening mechanisms connecting the lower heating assembly 14 to the base 12. The lower and upper heating assemblies 14, 16 may further be disassembled. The lower and upper heating members 52, 74 may be separated from the lower and upper covers 50, 72, respectively. The lower and upper insulators 54, 76 may then be separated from the lower and upper covers 50, 72, respectively. Finally, the lower thermostat assembly 56 may then be detached from the upper and lower heating members 52, 74.

The upper and lower heating members 52, 74 may be removable for repair, replacement, or for reconfiguring the cooking appliance 10 by replacing the respective heating member with another heating member having a different pattern formed on the cooking surface thereof. The lower and upper heating members 52, 74 may be removed for ease of cleaning. The lower cover 50, lower heating member 52, upper cover 72, upper heating member 74, and base 12 may be formed of a dishwasher safe material that allows each of these members to be disconnected from the lower thermostat assembly 56 and other electronic wiring to be placed individually into a dishwasher or cleaned by hand.

In operation, the cooking appliance 10 includes a plurality of operative positions in which the upper heating assembly 16 may be selectively located at a different position or orientation relative to the lower heating assembly 14. Each of the operative positions provides the cooking appliance 10 with operational advantages, thereby allowing a user to cook a variety of different foodstuffs or allowing the user to manipulate the foodstuff being cooked by selectively relocating the upper heating assembly 16 between the operative positions.

Figure 10A:
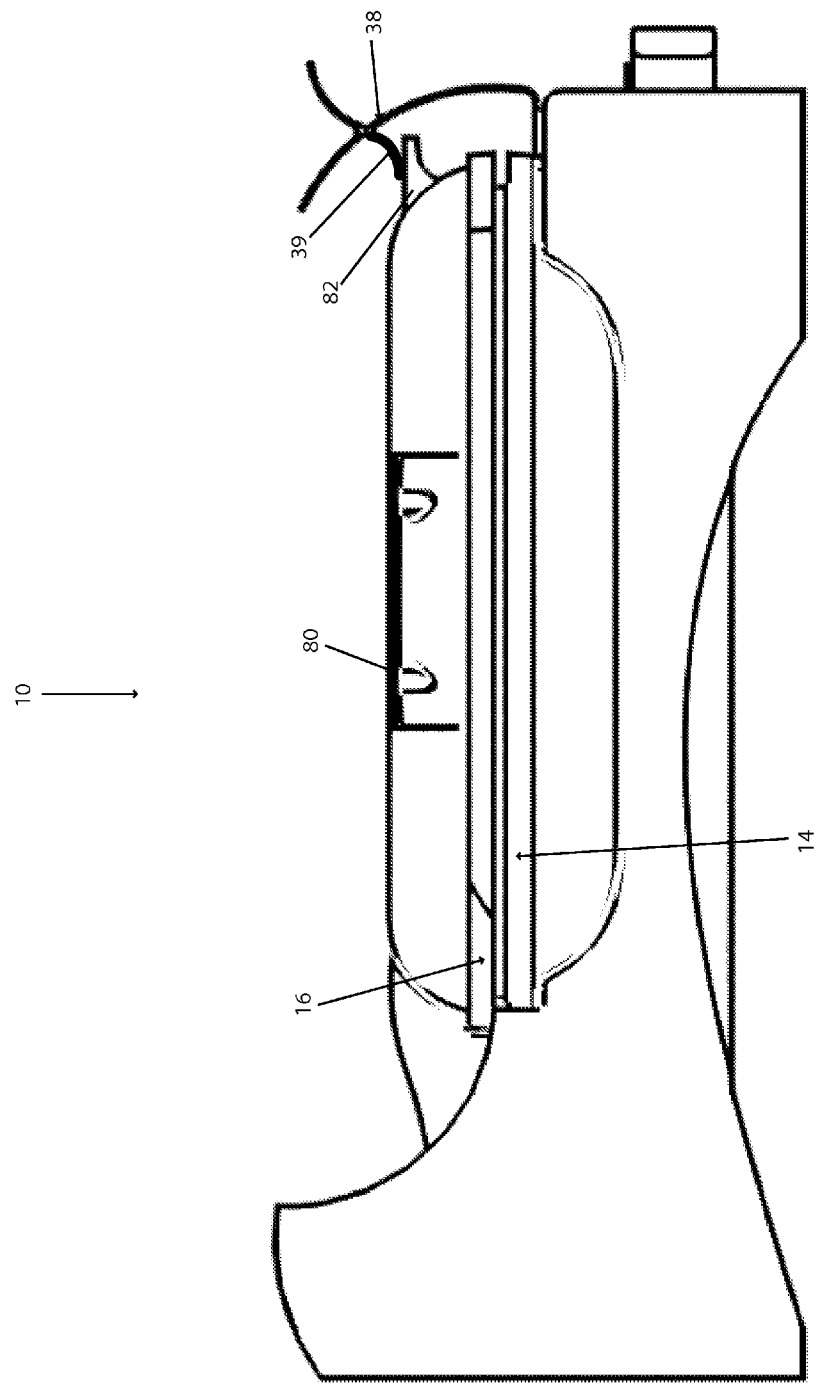
FIG. 10A is a side view of an embodiment of a cooking appliance in a first operative position.
Figure 10B:
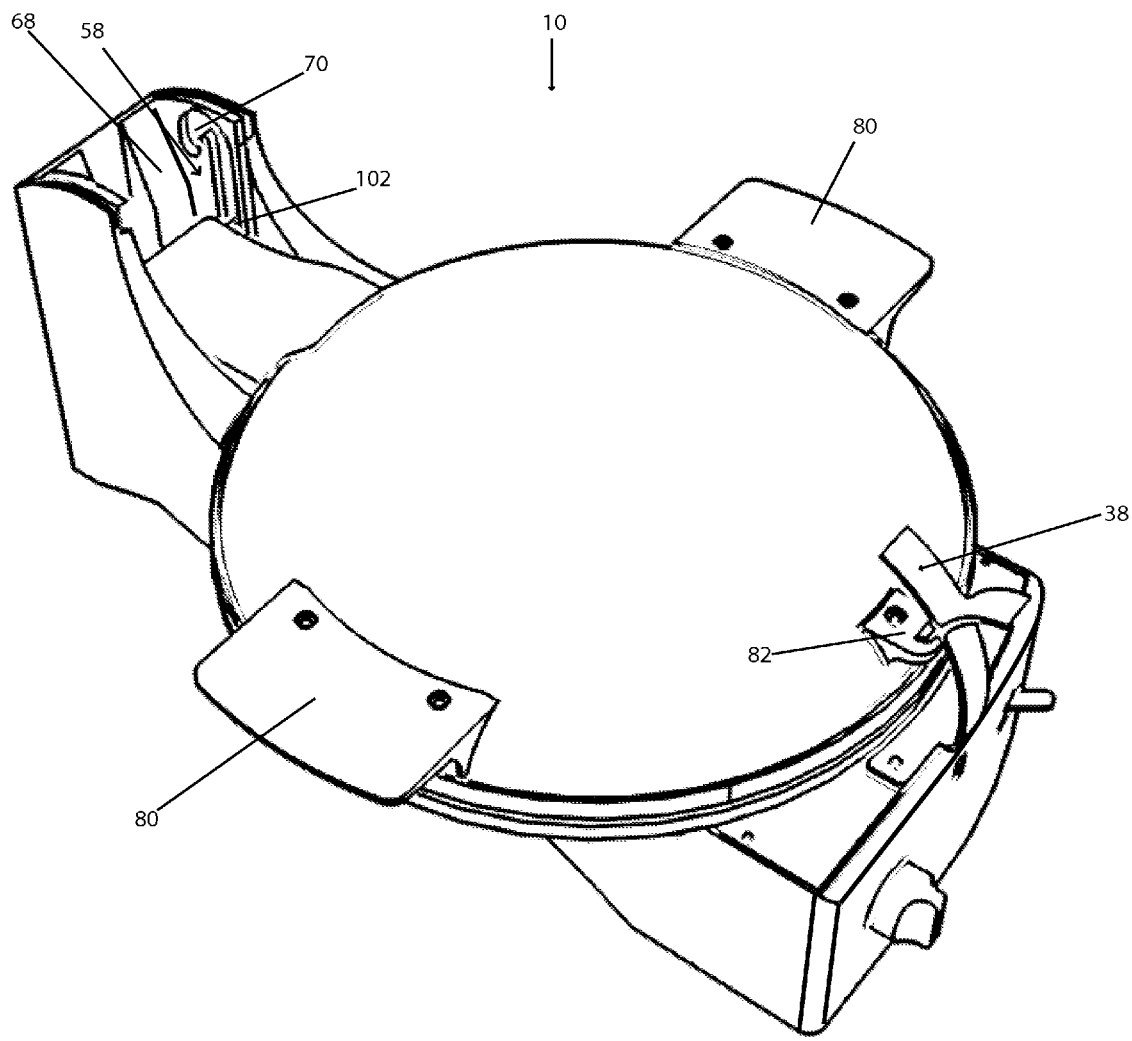
FIG. 10B is a top perspective view of the cooking appliance of FIG. 10A in the first operative position.

In a first operative position, the upper heating assembly 16 is lowered until the raised ridge 66 of the lower heating member 52 contacts the upper heating member 74, thereby enclosing a volume therebetween, as shown in FIGS. 10A and 10B. When in the first operative position, the securing member 39 of the lower latch member 38 engages the upper surface of the upper latch member 82. The lower latch member 38 is in an abutting relationship with the upper latch member 82, thereby securing the upper heating assembly 16 in an abutting relationship with the lower heating assembly 14. Lowering the upper heating assembly 16 into the first operative position compresses the batter or material disposed on the lower cooking surface 67, thereby causing the batter to spread out along the lower cooking surface 67 within the volume defined by the raised ridge 66. In an embodiment, the upper heating assembly 16 may be lowered into an abutting relationship with the lower heating assembly 14 by grasping the handles 80 and translating the upper heating assembly 16 in a substantially vertical direction such that the hinge pin 102 translates along the substantially linear portion of the tracks 70 of the hinge guide 58. In another embodiment, the first operative position may be achieved by rotating the upper heating assembly 16 toward the lower heating assembly 14 until the raised edge 66 contacts the upper heating member 74. When the upper heating assembly 16 is rotated into the first operative position, the hinge pin 102 remains disposed at the lowermost location within the substantially linear portion of the tracks 70 of the hinge guide 58 and the upper heating assembly 16 rotates about the axis formed by the hinge pin 102. The first operative position allows the user to compress the batter between the lower and upper heating assemblies 14, 16.

Figure 11A:
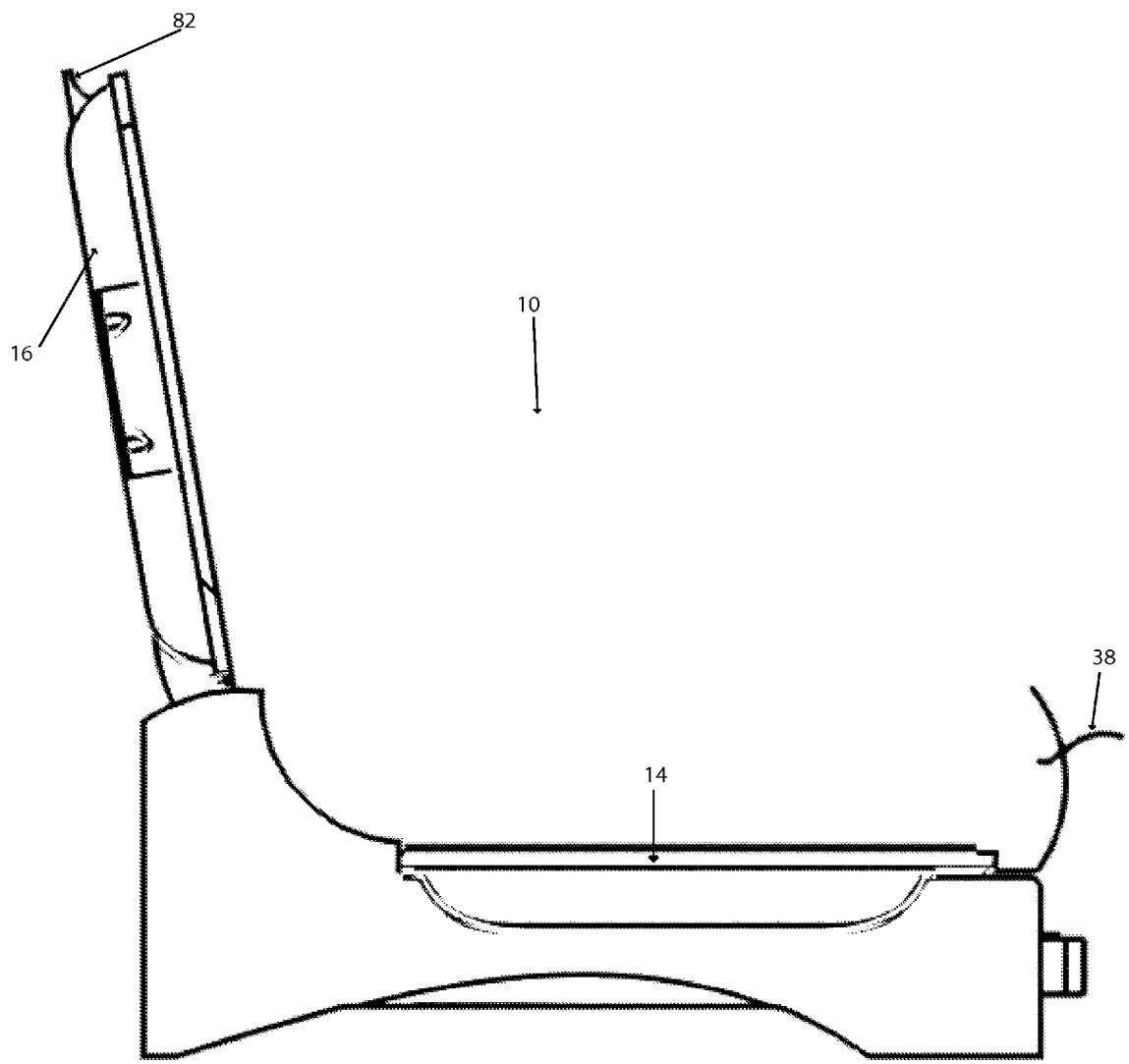
FIG. 11A is a side view of an embodiment of a cooking appliance in a second operative position.
Figure 11B:
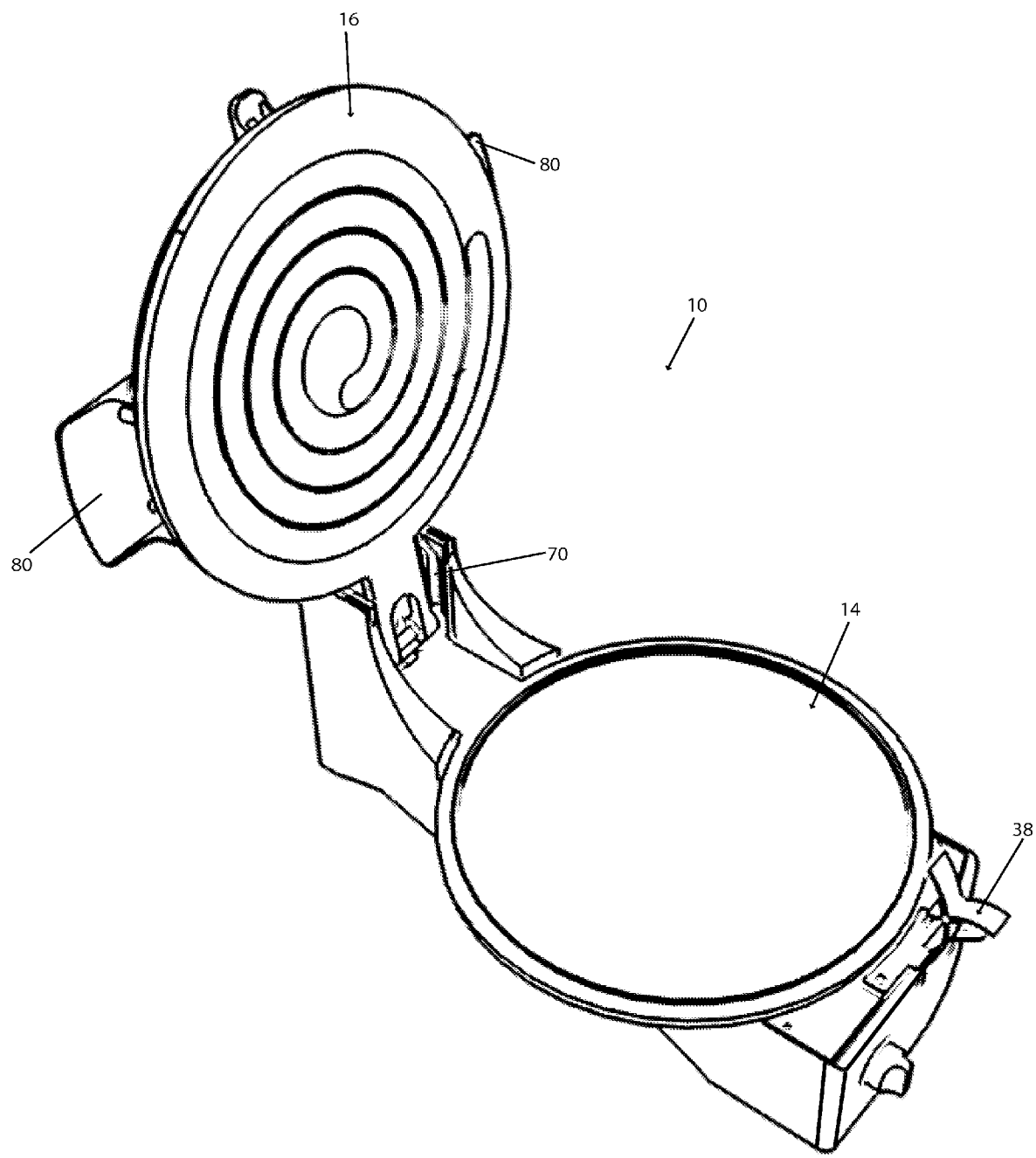
FIG. 11B is a top perspective view of the cooking appliance of FIG. 11A in the second operative position

In a second operative position, the upper heating assembly 16 is located at an angle relative to the lower heating assembly 14, as shown in FIGS. 11A and 11B. In the second operative position, the hinge pin 102 is located at the lowermost location of the substantially linear portion of the tracks 70 of the hinge guide 58. The lower latch member 38 is spaced apart from the upper latch member 82 when the upper heating assembly 16 is in the second operative position. The second operative position allows a user to open the cooking appliance 10 to add batter or mixture onto the lower cooking surface 67. The second operative position also allows the user to utilize only the lower cooking surface 67 to cook a foodstuff. The second operative position may be useful to allow the user to prepare crepes, pancakes, or the like, by keeping the upper heating assembly 16 away from the lower cooking surface 67.

Figure 12A:
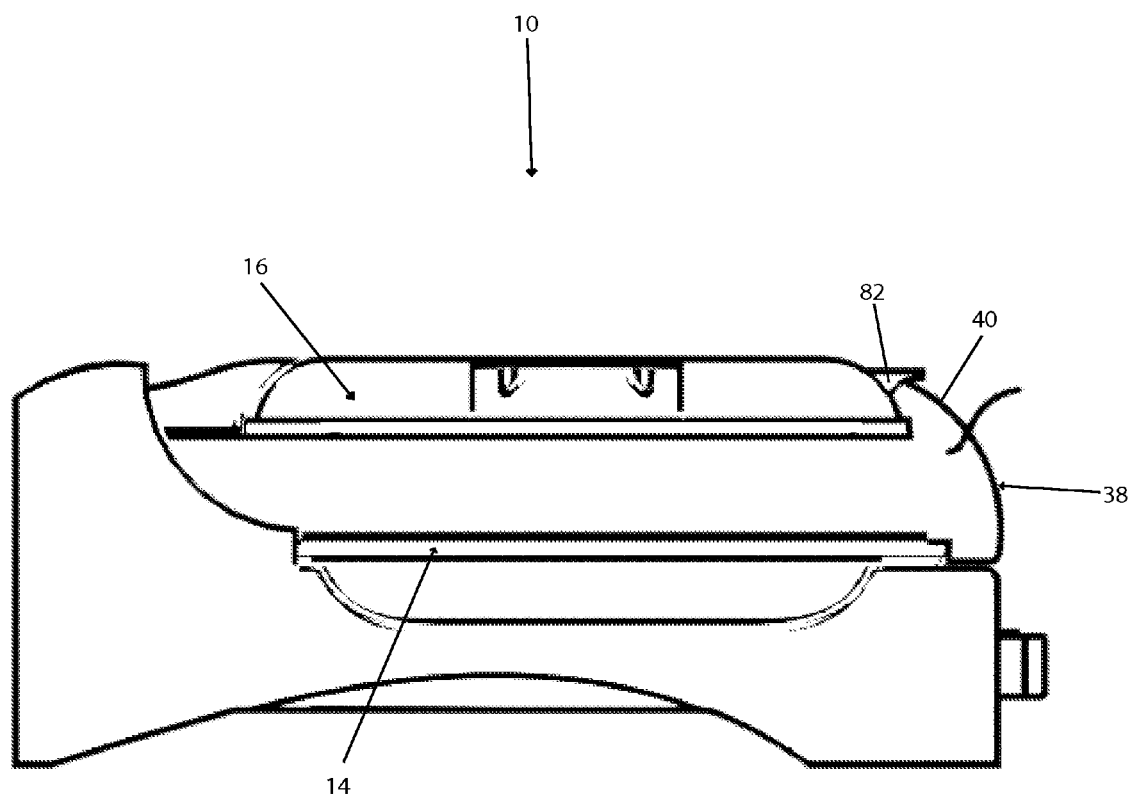
FIG. 12A is a side view of an embodiment of a cooking appliance in a third operative position.
Figure 12B:
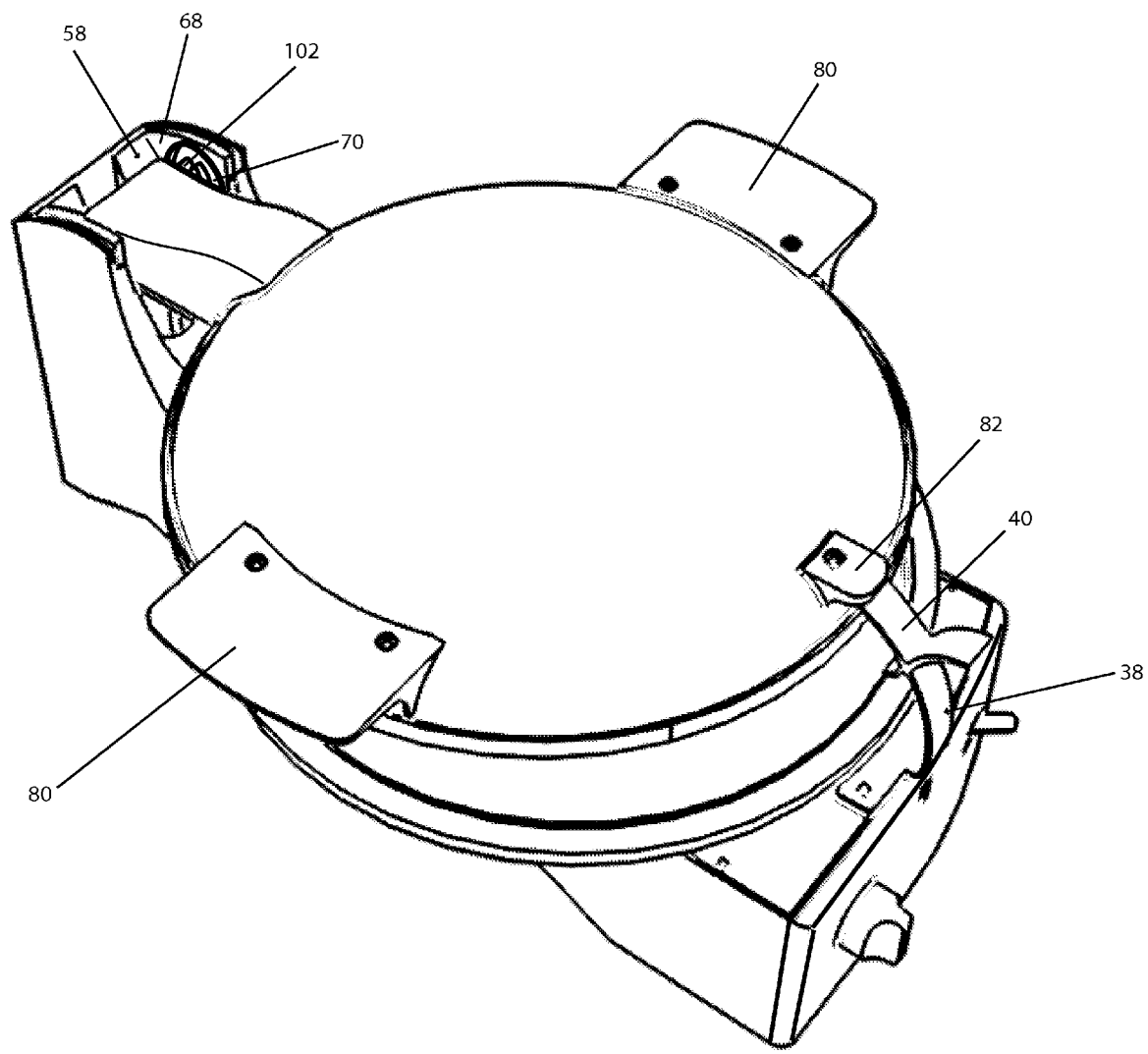
FIG. 12B is a top perspective view of the cooking appliance of FIG. 12A in the third operative position

In a third operative position the upper heating assembly 16 is located in a supported, spaced-apart relationship relative to the lower heating assembly 14, as shown in FIGS. 12A and 12B. In the third operative position, the hinge pin 102 is located at the rearwardmost position of the arced portion of the tracks 70 of the hinge guide 58, thereby preventing the hinge pin 102 from translating downwardly within the substantially linear portion of tracks 70, thereby preventing the upper heating assembly 16 from lowering toward the lower heating assembly 14 without assistance from the user. In addition, the upper heating assembly 16 is maintained in the third operative position relationship relative to the lower heating assembly 14 by the upper latch member 82 engaging and being supported by the stabilizing member 40 of the lower latch member 38. It should be understood by one skilled in the art that the weight of the upper heating assembly may be distributed such that the upper heating assembly 14 may be positively located in the third operative position in a cantilevered manner without additional support from the lower latch member 38. When in the third operative position, the upper cooking surface 90 is supported in a substantially parallel manner relative to the lower cooking surface 67. When in the third operative position, the upper cooking plate 86 does not contact the lower cooking plate 64, and the upper heating assembly may be positively located in the third operative position without contacting the foodstuff being cooked.

In the third operative position, the upper cooking surface 90 is spaced above the lower cooking surface 67 between about one-half (½) to five (5) inches (7.6-12.7 cm) when the hinge pin 102 is located in the rearwardmost position of the arced portion of the tracks 70. In an embodiment, the upper cooking surface 90 is spaced above the lower cooking surface 67 about one and one-half (1.5) inches when located in the third operative position. It should be understood by one skilled in the art that when in the third operative position, the upper cooking surface 90 may be spaced apart from the lower cooking surface 67 any distance sufficient to allow the foodstuff to be cooked using both the upper and lower cooking surfaces 67, 90 while the upper cooking surface 90 is secured in a substantially parallel relationship relative to the lower cooking surface 67. The stop members 48 and the lower latch member 38 ensure that the upper heating assembly 16 does not fall onto the lower heating assembly 14. In the third operative position, the upper cooking surface 90 does not contact the foodstuff being cooked. In another embodiment, the hinge pin 102 may be selectively located in the notches 174 (FIG. 6A) formed in the tracks 170, wherein upper cooking surface 90 is selectively locatable at a plurality of spaced-apart distances above the lower cooking surface 67. Each of the notches 174 provides another operative position for the upper heating assembly 16 relative to the lower heating assembly 14.

The second operative position allows the user to manipulate the shape of the foodstuff without the user needing to hold the upper heating assembly 16 in the spaced-apart relationship relative to the lower heating assembly 14. For example, when making a dosa, the user may add a filling onto the top surface of the dosa and roll the dosa into a substantially cylindrical form while the upper heating assembly 16 remains spaced above the rolled dosa. Once the dosa has been rolled, the user locates the upper heating assembly 16 in the third operative position to allow both the upper and lower cooking surfaces 67, 90 to continue to cook the foodstuff while the foodstuff is in contact with the lower cooking surface 67. In an embodiment, the upper cooking surface 90 may be maintained in the third operative position in which the upper cooking surface 90 is sufficiently near the rolled dosa to continue cooking the upper portion of the rolled dosa with the upper cooking surface 90. In the alternative, when in the third operative position, the upper cooking surface 90 is spaced apart a sufficient distance from the rolled dosa that the upper cooking surface 90 does not continue to cook the rolled dosa. In another example, when making a crepe, the user may add a filling and roll the crepe in the same manner as forming a rolled dosa while the upper cooking surface 90 is maintained in a spaced-apart position relative to the lower cooking surface 67.

To release the upper heating assembly 16 from the third operative position, the lower latch member 38 is bent in a forward manner such that the securing member 40 no longer engages the upper latch member 82. The upper heating assembly 16 may also be released from the third operative position by slightly raising the upper heating assembly 16 relative to the lower heating assembly 14, wherein the lower latch member 38 is self-biasing to a position that allows the upper heating assembly 16 to be translated relative to the lower heating assembly 14 without interference from the lower latch member 38

Figure 13A:
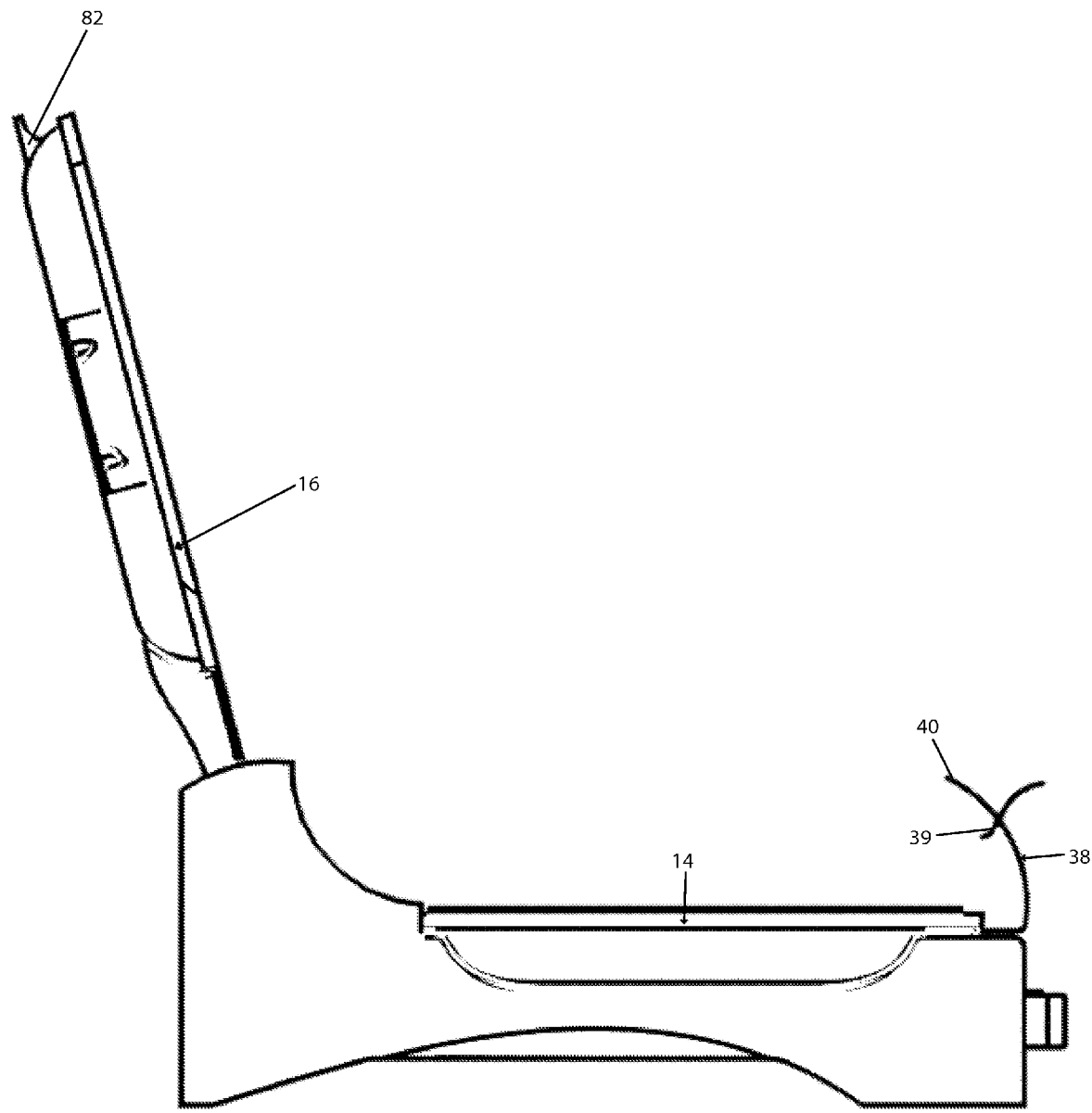
FIG. 13A is a side view of an embodiment of a cooking appliance in a fourth operative position.
Figure 13B:
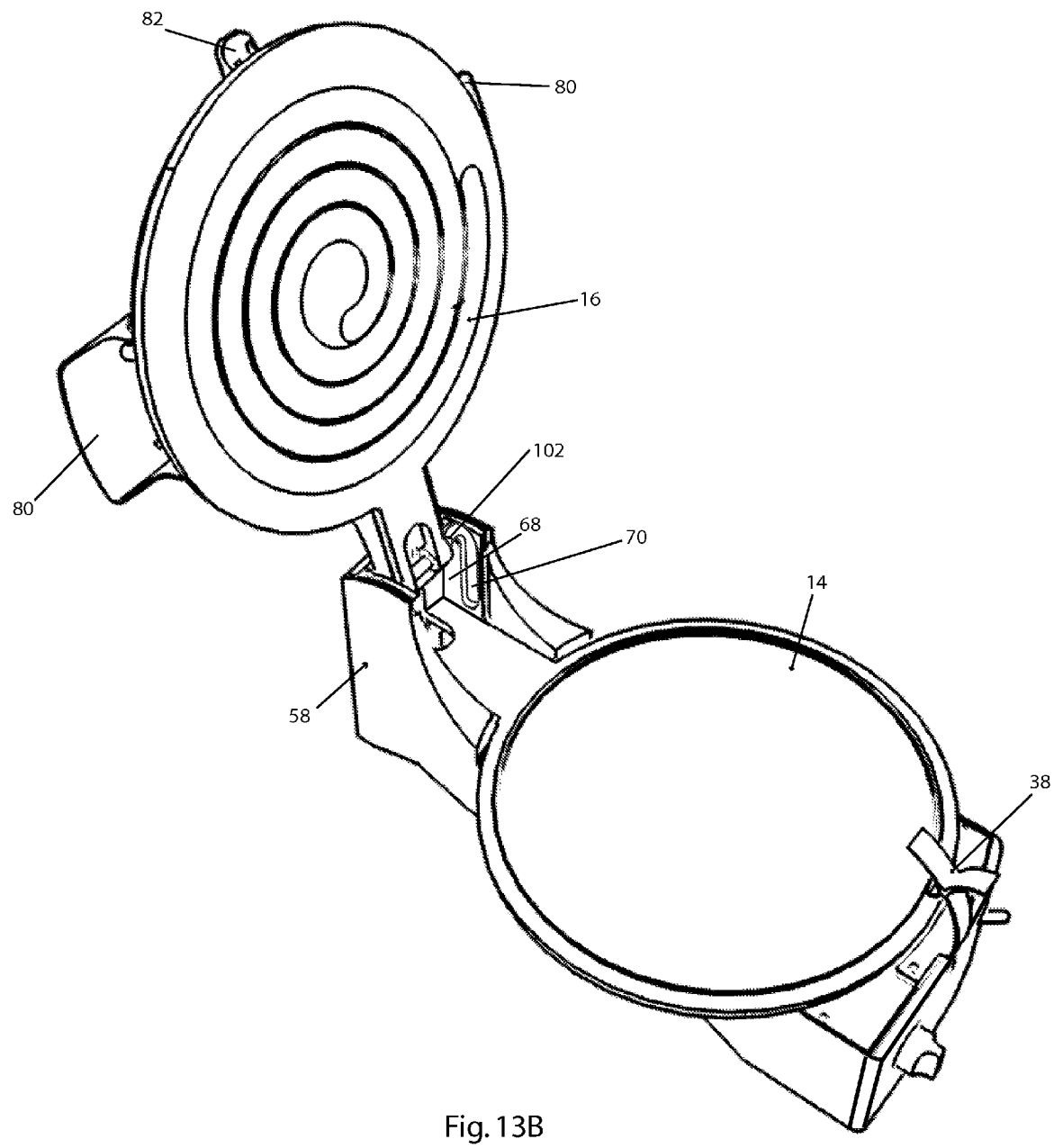
FIG. 13B is a top perspective view of the cooking appliance of FIG. 13A in the fourth operative position.

In a fourth operative position, the upper heating assembly 16 is located in a spaced-apart, angled relationship relative to the lower heating assembly 14, as shown in FIGS. 13A and 13B. In the fourth operative position, the hinge pin 102 is located in the rearwardmost position of the arced portion of the tracks 70 of the hinge guide 58 and the upper latch member 82 is spaced-apart from the securing member 39 of the lower latch member 38. The upper heating assembly 16 is rotated away from the lower heating assembly 14 until the hinge guide 58 contacts the hinge cover 78, thereby maintaining the upper heating assembly 16 in an opened position. Like the second operative position, the fourth operative position allows a user to add batter or mixture onto the lower cooking surface 67 while the upper heating assembly 16 is opened. The fourth operative position also allows the user to manipulate the foodstuff while it is cooking by rolling, flipping, or any other manner.

During use, the upper heating assembly 16 of the cooking appliance 10 is locatable to an unsupported position between one of the secured operative positions in which the upper cooking surface 90 is in contact with the upwardly directed surface of the foodstuff located between the lower and upper cooking surfaces 67, 90. In this position, the upwardly directed surface of the foodstuff maintains the upper heating assembly 16 in a spaced-apart relationship relative to the lower heating assembly 14, thereby preventing the upper heating assembly 16 from being lowered toward the lower heating assembly 14. The upper heating assembly 16 is supported in the spaced-apart position by the foodstuff located between the lower and upper heating assemblies 14, 16. When the upper heating assembly 16 contacts the foodstuff, the upper cooking surface 90 is maintained in a substantially parallel relationship relative to the lower cooking surface 67 by the foodstuff therebetween. The lower and upper cooking surfaces 67, 90 are both utilized in cooking the foodstuff. The spaced-apart distance at which upper cooking surface 90 is maintained relative to the lower cooking surface 67 is determined by the thickness of the foodstuff therebetween. For example, the cooking appliance 10 may be used to cook paninis, wherein the upper heating assembly 16 may be lowered from the third operative position in a translational manner relative to the lower heating assembly 14 such that the upper cooking surface 90 contacts the top surface of the panini, thereby grilling both the bottom and top surfaces of the panini.

The handles 80 of the upper heating assembly 16 allow the user to safely adjust the upper heating assembly 16 relative to the lower heating assembly 14 between the operative positions. The handles 80 may be used to move the upper heating assembly 16 relative to the lower heating assembly 14 in a substantially linear, translational manner, a rotational manner, or a combination thereof, it should be understood by one skilled in the art that the upper heating assembly 16 may translate relative to the lower heating assembly whereby the upper cooking surface 90 remains in a substantially parallel relationship with the lower cooking surface 67. While only four operative positions are described above, additional operative positions of the upper heating assembly 16 relative to the lower heating assembly 14 may be obtained through modification of elements described above, such as the tracks 70 or the lower latch member 38 that would be understood by one skilled in the art. It should also be understood by one skilled in the art that the lower cooking surface 67 may be used to cook a flatbread or other foodstuff alone or in combination with the upper cooking surface 90, depending upon the application for which the cooking appliance 10 is being used and the operative location at which the upper heating assembly 16 is located.

While preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

The invention is claimed as follows:

1. A cooking appliance comprising:
   a first heating assembly having a front, a back, two sides, at least two handles extending from the two sides and a first cooking surface; and
   a second heating assembly having a second cooking surface, said second heating assembly being operatively connected to said first heating assembly, wherein said first cooking surface is locatable in at least three operative positions relative to said second cooking surface and said at least two handles enable a user to translate said first cooking surface in a substantially linear manner relative to said second cooking surface and manually engage at least one hinge pin associated with said first heating assembly with one of a plurality of notches of a J-shaped track, wherein the at least one hinge pin and the J-shaped track are configured such that if the user does not manually engage the at least one hinge pin with one of the plurality of notches, a weight of said first heating assembly cannot be supported by the at least one hinge pin in relation to the respective notch of the J-shaped track, said at least three operative positions including:
   (i) a first operative position wherein said first cooking surface is secured in an abutting relationship with said second cooking surface,
   (ii) a second operative position wherein said first cooking surface is located at an angle relative to said second cooking surface,
   (iii) a third operative position wherein said first cooking surface is secured in a spaced-apart relationship relative to said second cooking surface, and said first cooking surface is oriented along a plane substantially parallel to said second cooking surface, and
   (iv) a fourth operative position relative to said second cooking surface wherein said first cooking surface is secured in a spaced-apart relationship relative to said second cooking surface at a different space from said second cooking surface than in said third operative position, and said first cooking surface being oriented along a plane substantially parallel to said second cooking surface, wherein when in said third operative position and said fourth operative position, the weight of said first heating assembly is supported in said respective spaced apart relationship by the at least one hinge pin associated with said first heating assembly abutted against a respective notch of the J-shaped track, and wherein said first cooking surface is maintainable in a substantially parallel relationship with the second cooking surface as said first cooking surface is substantially linearly translated relative to the second cooking surface between the first, third and fourth operative positions by said user via the at least two handles.

2. The cooking appliance of claim 1, wherein said first heating assembly is translatable relative to said second heating assembly.

3. The cooking appliance of claim 1, wherein said first heating assembly is rotatable relative to said second heating assembly.

4. The cooking appliance of claim 1, wherein said first cooking surface has a first pattern and said second cooking surface has a second pattern.

5. The cooking appliance of claim 4, wherein said first and second patterns are different.

6. The cooking appliance of claim 4, wherein said first pattern is a spiral-shaped raised ridge and said second pattern is substantially flat.

7. The cooking appliance of claim 1, wherein said first heating assembly and said second heating assembly are configured to be capable of operation at different relative temperatures.

8. A cooking appliance comprising:
   a first heating assembly having a first cooking surface and a raised edge extending from said first cooking surface; and
   a second heating assembly having a front, a back, two sides, at least two handles extending from the two sides and a second cooking surface, said second heating assembly operatively connected to said first heating assembly, wherein said second cooking surface is translatable in a substantially linear manner relative to said first cooking surface, wherein said second cooking surface is locatable in at least three operative positions relative to said first cooking surface and said at least two handles enable a user to translate said second cooking surface in the substantially linear manner relative to said first cooking surface and manually engage at least one hinge pin associated with said second heating assembly with one of a plurality of notches of a J-shaped track wherein the at least one hinge pin and the J-shaped track are configured such that if the user does not manually engage the at least one hinge pin with one of the plurality of notches, a weight of said second heating assembly cannot be supported by the at least one hinge pin in relation to the respective notch of the J-shaped track, said at least three operative positions including:
   (i) a first operative position wherein said second cooking surface abuts said raised edge,
   (ii) a second operative position wherein said second cooking surface is located at an angle relative to said first cooking surface,
   (iii) a third operative position wherein said second cooking surface is maintained in a spaced-apart relationship relative to said first cooking surface, and said second cooking surface is oriented along a plane substantially parallel to said first cooking surface, and
   (iv) a fourth operative position relative to said first cooking surface wherein said second cooking surface is secured in a spaced-apart relationship relative to said first cooking surface at a different space from said first cooking surface than in said third operative position, and said second cooking surface being oriented along a plane substantially parallel to said first cooking surface, wherein when in said third operative position and said fourth operative position, the weight of said second heating assembly is supported in said respective spaced apart relationship by the at least one hinge pin associated with said second heating assembly abutted against a respective notch of the J-shaped track, and wherein said second cooking surface is maintainable in a substantially parallel relationship with the first cooking surface as said second cooking surface is substantially linearly translated relative to the second cooking surface between the first, third and fourth operative positions by said user via the at least two handles.

9. The cooking appliance of claim 8, further including said second cooking surface being maintainable in a position spaced apart from said first cooking surface at a plurality of different distances from said first cooking surface, wherein said second cooking surface is substantially parallel to said first cooking surface.

10. The cooking appliance of claim 8, wherein at least one of said first and second cooking surfaces is removable.

11. The cooking appliance of claim 8, wherein said first cooking surface is interchangeable with a third cooking surface, and said second cooking surface is interchangeable with a fourth cooking surface.

12. The cooking appliance of claim 8, wherein said second cooking surface is securable in at least three operative positions relative to said first cooking surface.

13. The cooking appliance of claim 8, wherein said first heating assembly and said second heating assembly are configured to be capable of operation at different relative temperatures.

14. A cooking appliance comprising:
- a base having a front portion, central portion, and a rear portion,
- a lower heating assembly attached to said base, said lower heating assembly including a substantially flat lower cooking surface,
- an upper heating assembly operatively connected to said lower heating assembly, said upper heating assembly including a front, a back, two sides, at least two handles extending from the two sides and an upper cooking surface, wherein said upper cooking surface includes a spiral-shaped raised ridge, said upper heating assembly being maintainable in at least two operative positions wherein said upper cooking surface is maintained in a spaced-apart relationship relative to said lower cooking surface, and wherein said at least two handles enable a user to translate said upper cooking surface in the substantially linear manner relative to said lower cooking surface and manually engage at least one hinge pin connected to said upper heating assembly which is translatable within an inverted J-shaped track including a plurality of notches for adjusting said upper cooking surface relative to said lower cooking surface with a respective one of the plurality of notches, wherein the at least one hinge pin and the J-shaped track are configured such that if the user does not manually engage the at least one hinge pin with one of the plurality of notches, a weight of said upper heating assembly cannot be supported by the at least one hinge pin in relation to the respective notch of the J-shaped track, wherein when in said at least two operative positions, the weight of said upper heating assembly is supported by the at least one hinge pin being abutted against the respective notch of said inverted J-shaped track, and wherein said upper cooking surface is maintainable in a substantially parallel relationship with the lower cooking surface as said upper cooking surface is substantially linearly translated relative to the lower cooking surface between the at least two operative positions by said user via the at least two handles.

15. The cooking appliance of claim 14, wherein said upper heating assembly is removable from said lower heating assembly and said lower heating assembly is removable from said base.

16. The cooking appliance of claim 14 further including a raised edge extending from said lower cooking surface a first distance.

17. The cooking appliance of claim 16, wherein said lower cooking surface is replaceable with a second lower cooking surface having a raised edge extending from said second lower cooking surface a second distance, said first distance being different than said second distance.

18. The cooking appliance of claim 14, wherein said first heating assembly and said second heating assembly are configured to be capable of operation at different relative temperatures.

\* \* \* \* \*